US008626851B2

(12) United States Patent
Buchheit et al.

(10) Patent No.: US 8,626,851 B2
(45) Date of Patent: *Jan. 7, 2014

(54) EMAIL CONVERSATION MANAGEMENT SYSTEM

(75) Inventors: Paul Buchheit, Mountain View, CA (US); Sanjeeve Singh, South San Francisco, CA (US)

(73) Assignee: Google Inc., Mountain View, CA (US)

( * ) Notice: Subject to any disclaimer, the term of this patent is extended or adjusted under 35 U.S.C. 154(b) by 188 days.

This patent is subject to a terminal disclaimer.

(21) Appl. No.: 12/892,842

(22) Filed: Sep. 28, 2010

(65) Prior Publication Data

US 2011/0016189 A1     Jan. 20, 2011

Related U.S. Application Data

(62) Division of application No. 10/816,427, filed on Mar. 31, 2004, now Pat. No. 7,814,155.

(51) Int. Cl.
G06F 15/16 (2006.01)
G06F 3/00 (2006.01)

(52) U.S. Cl.
USPC .......................................... 709/206; 715/739

(58) Field of Classification Search
USPC ................... 709/204–207; 715/739, 752, 810
See application file for complete search history.

(56) References Cited

U.S. PATENT DOCUMENTS

| 5,208,748 A | 5/1993 | Flores et al. ................... 364/419 |
| 5,216,603 A | 6/1993 | Flores et al. ................... 364/219 |
| 5,479,408 A | 12/1995 | Will |
| 5,613,108 A | 3/1997 | Morikawa ....................... 393/616 |
| 5,734,837 A | 3/1998 | Flores et al. ................... 395/207 |
| 5,740,549 A | 4/1998 | Reilly et al. ....................... 705/14 |
| 5,761,689 A | 6/1998 | Rayson et al. ................. 707/533 |
| 5,832,502 A | 11/1998 | Durham et al. ................ 707/104 |
| 5,872,925 A | 2/1999 | Han |
| 5,905,863 A | 5/1999 | Knowles et al. .......... 395/200.36 |
| 5,913,040 A | 6/1999 | Rakavy et al. ............ 395/200.62 |
| 5,948,058 A | 9/1999 | Kudoh et al. .................. 709/206 |

(Continued)

FOREIGN PATENT DOCUMENTS

| EP | 0886228 A2 | 12/1998 |
| GB | 2369218 A | 5/2002 |

(Continued)

OTHER PUBLICATIONS

About Microsoft Word screen shot, May 28, 2007, 1 page.

(Continued)

*Primary Examiner* — Aaron Strange

(74) *Attorney, Agent, or Firm* — Morgan, Lewis & Bockius LLP

(57) ABSTRACT

A system and method are disclosed for producing a list of conversations as the result of a search query. Messages are received and associated with a conversation. Each of the conversations has a respective conversation identifier and includes one or more messages. Messages, and related message information, are indexed for text searching and information about the message is stored in a memory to associate the message to its respective conversation identifier. The index can be searched to identify one or more messages relevant to a search query. At least some of the conversations to which the one or more messages belong are identified and produced as the search result.

19 Claims, 28 Drawing Sheets

(56) References Cited

U.S. PATENT DOCUMENTS

| | | | |
|---|---|---|---|
| 5,959,621 A | 9/1999 | Nawaz et al. | 345/329 |
| 6,021,427 A | 2/2000 | Spagna et al. | 709/206 |
| 6,029,164 A | 2/2000 | Birrell et al. | 707/3 |
| 6,085,206 A | 7/2000 | Domini et al. | 707/533 |
| 6,151,596 A | 11/2000 | Hosomi | 707/1 |
| 6,182,098 B1 | 1/2001 | Selker | 707/526 |
| 6,185,551 B1 | 2/2001 | Birrell et al. | 707/3 |
| 6,330,589 B1 | 12/2001 | Kennedy | 709/206 |
| 6,350,066 B1 | 2/2002 | Bobo, II | 709/206 |
| 6,396,513 B1 * | 5/2002 | Helfman et al. | 715/752 |
| 6,408,297 B1 | 6/2002 | Ohashi | 707/10 |
| 6,421,694 B1 | 7/2002 | Nawaz et al. | 707/526 |
| 6,438,564 B1 | 8/2002 | Morton et al. | |
| 6,493,702 B1 | 12/2002 | Adar et al. | 707/3 |
| 6,493,703 B1 | 12/2002 | Knight et al. | 707/3 |
| 6,507,351 B1 | 1/2003 | Bixler | 345/810 |
| 6,549,957 B1 | 4/2003 | Hanson et al. | 710/5 |
| 6,594,693 B1 | 7/2003 | Borwankar | |
| 6,606,644 B1 | 8/2003 | Ford et al. | 709/203 |
| 6,640,239 B1 | 10/2003 | Gidwani | |
| 6,665,668 B1 | 12/2003 | Sugaya et al. | 706/6 |
| 6,683,627 B1 | 1/2004 | Ullmann et al. | 345/786 |
| 6,708,205 B2 | 3/2004 | Sheldon et al. | 709/206 |
| 6,725,228 B1 | 4/2004 | Clark et al. | 707/102 |
| 6,742,042 B1 | 5/2004 | Orton et al. | 709/230 |
| 6,745,197 B2 | 6/2004 | McDonald | 707/102 |
| 6,757,889 B1 | 6/2004 | Ito | 717/112 |
| 6,771,291 B1 | 8/2004 | DiStefano, III | 345/762 |
| 6,785,869 B1 | 8/2004 | Berstis | 715/532 |
| 6,820,081 B1 | 11/2004 | Kawai et al. | 707/7 |
| 6,834,276 B1 | 12/2004 | Jensen et al. | |
| 6,889,361 B1 | 5/2005 | Bates et al. | 715/533 |
| 6,892,196 B1 | 5/2005 | Hughes | 707/4 |
| 6,973,481 B2 | 12/2005 | MacIntosh et al. | 709/206 |
| 7,010,616 B2 | 3/2006 | Carlson et al. | |
| 7,017,173 B1 | 3/2006 | Armstrong et al. | 725/87 |
| 7,035,903 B1 | 4/2006 | Baldonado | 709/206 |
| 7,043,690 B1 | 5/2006 | Bates et al. | 715/533 |
| 7,069,300 B2 | 6/2006 | Toyota et al. | |
| 7,089,278 B1 | 8/2006 | Churchill et al. | 709/203 |
| 7,107,544 B1 | 9/2006 | Luke | |
| 7,120,668 B2 | 10/2006 | Manber et al. | 709/205 |
| 7,139,850 B2 | 11/2006 | Amemiya et al. | 710/48 |
| 7,143,135 B2 | 11/2006 | Smith et al. | 709/204 |
| 7,171,429 B2 | 1/2007 | Frieden et al. | |
| 7,206,388 B2 | 4/2007 | Diacakis | |
| 7,213,210 B2 | 5/2007 | Reysa | |
| 7,222,299 B1 | 5/2007 | Lim et al. | |
| 7,328,242 B1 | 2/2008 | McCarthy et al. | |
| 7,340,674 B2 | 3/2008 | Newman | |
| 7,356,772 B2 | 4/2008 | Brownholtz et al. | 715/752 |
| 7,359,936 B2 | 4/2008 | Gruen et al. | 709/203 |
| 7,383,250 B2 | 6/2008 | Scian et al. | |
| 7,383,307 B2 | 6/2008 | Kirkland et al. | 709/206 |
| 7,386,439 B1 | 6/2008 | Charnock et al. | |
| 7,412,437 B2 | 8/2008 | Moody et al. | |
| 7,421,690 B2 | 9/2008 | Forstall et al. | 718/100 |
| 7,433,920 B2 | 10/2008 | Blagsvedt et al. | 709/204 |
| 7,472,357 B1 | 12/2008 | Satterfield et al. | |
| 7,484,175 B2 | 1/2009 | Kirkland | 715/751 |
| 7,523,222 B2 | 4/2009 | Carlson et al. | |
| 7,565,534 B2 | 7/2009 | Starbuck et al. | |
| 7,599,852 B2 | 10/2009 | Bosarge et al. | 705/14 |
| 7,693,866 B1 | 4/2010 | Weaver et al. | |
| 7,716,593 B2 | 5/2010 | Durazo et al. | |
| 7,730,113 B1 | 6/2010 | Payette et al. | |
| 7,788,326 B2 | 8/2010 | Buchheit et al. | |
| 7,904,510 B2 | 3/2011 | Anderson et al. | |
| 8,265,670 B2 | 9/2012 | Yasuda et al. | |
| 2001/0016845 A1 | 8/2001 | Tribbensee | 707/10 |
| 2001/0042100 A1 | 11/2001 | Guedalia et al. | 709/206 |
| 2001/0047294 A1 | 11/2001 | Rothschild | 705/14 |
| 2002/0010775 A1 | 1/2002 | Rakavy et al. | 709/224 |
| 2002/0073156 A1 | 6/2002 | Newman | |
| 2002/0108125 A1 | 8/2002 | Joao | |
| 2002/0169841 A1 | 11/2002 | Carlson et al. | |
| 2002/0188683 A1 | 12/2002 | Lytle et al. | |
| 2002/0194229 A1 | 12/2002 | Decime et al. | 707/533 |
| 2003/0009385 A1 | 1/2003 | Tucciarone et al. | 705/26 |
| 2003/0020749 A1 | 1/2003 | Abu-Hakima et al. | 345/752 |
| 2003/0055711 A1 | 3/2003 | Doherty | 705/10 |
| 2003/0093315 A1 | 5/2003 | Sato | 705/14 |
| 2003/0101065 A1 | 5/2003 | Rohall et al. | 705/1 |
| 2003/0110227 A1 | 6/2003 | O'Hagan | 709/206 |
| 2003/0120737 A1 | 6/2003 | Lytle et al. | |
| 2003/0135555 A1 | 7/2003 | Birrel et al. | |
| 2003/0145285 A1 | 7/2003 | Miyahira et al. | 715/533 |
| 2003/0158903 A1 | 8/2003 | Rohall et al. | |
| 2003/0163537 A1 | 8/2003 | Rohall et al. | 709/206 |
| 2003/0167310 A1 | 9/2003 | Moody et al. | 709/206 |
| 2003/0177190 A1 | 9/2003 | Moody et al. | |
| 2003/0229607 A1 | 12/2003 | Zellweger et al. | |
| 2003/0233419 A1 | 12/2003 | Beringer | 709/206 |
| 2004/0015553 A1 | 1/2004 | Griffin et al. | |
| 2004/0044735 A1 | 3/2004 | Hoblit | |
| 2004/0054737 A1 | 3/2004 | Daniell | 709/206 |
| 2004/0059712 A1 | 3/2004 | Dean et al. | 707/1 |
| 2004/0078432 A1 | 4/2004 | Manber et al. | 709/205 |
| 2004/0083265 A1 | 4/2004 | Beringer | |
| 2004/0098488 A1 | 5/2004 | Mayers | |
| 2004/0133564 A1 | 7/2004 | Gross et al. | 707/3 |
| 2004/0153509 A1 | 8/2004 | Alcorn et al. | 709/205 |
| 2004/0186766 A1 | 9/2004 | Fellenstein et al. | |
| 2004/0199589 A1 | 10/2004 | Keohane et al. | 709/206 |
| 2004/0205141 A1 | 10/2004 | Goland | 709/206 |
| 2004/0210587 A1 | 10/2004 | Reysa | 707/100 |
| 2004/0260710 A1 | 12/2004 | Marston et al. | 707/100 |
| 2004/0260756 A1 | 12/2004 | Forstall et al. | 709/200 |
| 2004/0267700 A1 | 12/2004 | Dumais et al. | |
| 2005/0004990 A1 * | 1/2005 | Durazo et al. | 709/206 |
| 2005/0060643 A1 | 3/2005 | Glass et al. | 715/501.1 |
| 2005/0080859 A1 | 4/2005 | Lake | |
| 2005/0086096 A1 | 4/2005 | Bryant | |
| 2005/0086598 A1 | 4/2005 | Marshall et al. | 715/530 |
| 2005/0091320 A1 | 4/2005 | Kirsch et al. | 709/206 |
| 2005/0108345 A1 | 5/2005 | Suzuki | |
| 2005/0114781 A1 | 5/2005 | Brownholtz et al. | 715/733 |
| 2005/0138002 A1 | 6/2005 | Giacobbe et al. | 707/3 |
| 2005/0144157 A1 * | 6/2005 | Moody et al. | 707/3 |
| 2005/0144241 A1 | 6/2005 | Stata et al. | 709/206 |
| 2005/0198172 A1 | 9/2005 | Appelman et al. | |
| 2005/0198173 A1 | 9/2005 | Evans | 709/206 |
| 2005/0198256 A1 | 9/2005 | Moody et al. | 709/224 |
| 2005/0204009 A1 | 9/2005 | Hazarika et al. | |
| 2005/0223061 A1 | 10/2005 | Auerbach et al. | |
| 2005/0223066 A1 | 10/2005 | Buchheit et al. | 709/206 |
| 2005/0223067 A1 | 10/2005 | Buchheit et al. | |
| 2005/0223072 A1 | 10/2005 | Greve et al. | |
| 2005/0289468 A1 | 12/2005 | Kahn et al. | |
| 2006/0026593 A1 | 2/2006 | Canning et al. | |
| 2006/0031304 A1 | 2/2006 | Bagga et al. | |
| 2006/0085502 A1 | 4/2006 | Sundararajan et al. | |
| 2006/0123091 A1 | 6/2006 | Ho | 709/206 |
| 2006/0128404 A1 | 6/2006 | Klassen et al. | |
| 2006/0168067 A1 | 7/2006 | Carlson et al. | |
| 2006/0248209 A1 | 11/2006 | Chiu et al. | 709/231 |
| 2007/0047697 A1 | 3/2007 | Drewry et al. | 379/88.13 |
| 2007/0067404 A1 | 3/2007 | Brown et al. | 709/206 |
| 2007/0143411 A1 | 6/2007 | Costea et al. | 709/206 |
| 2007/0143428 A1 | 6/2007 | Kumar et al. | 709/206 |
| 2007/0198639 A1 | 8/2007 | Litwin et al. | 709/206 |
| 2007/0255791 A1 | 11/2007 | Bodlaender et al. | |
| 2008/0091656 A1 | 4/2008 | Charnock et al. | |
| 2008/0147815 A1 | 6/2008 | Damm et al. | 709/206 |
| 2008/0281813 A1 | 11/2008 | Moody et al. | |
| 2008/0313292 A1 | 12/2008 | Forstall et al. | 709/206 |
| 2009/0089292 A1 | 4/2009 | Cheah | |
| 2010/0030798 A1 | 2/2010 | Kumar et al. | |
| 2010/0241700 A1 | 9/2010 | Rasmussen et al. | |
| 2011/0225249 A1 | 9/2011 | Forstall et al. | |
| 2011/0264750 A1 | 10/2011 | Fabre et al. | |
| 2012/0185797 A1 | 7/2012 | Thorsen et al. | |
| 2012/0209853 A1 | 8/2012 | Desai et al. | |

(56) References Cited

U.S. PATENT DOCUMENTS

FOREIGN PATENT DOCUMENTS

| | | |
|---|---|---|
| JP | 9-128407 A | 5/1997 |
| JP | 11-015763 | 1/1999 |
| JP | 2001-222477 A | 8/2001 |
| JP | 2002-359667 A | 12/2002 |
| JP | 2003-030216 | 1/2003 |
| JP | 2003-108278 A | 4/2003 |
| JP | 2004-173124 | 6/2004 |
| JP | 2005-536790 | 12/2005 |
| WO | WO 00/23931 | 4/2000 |
| WO | WO 01/61551 A1 | 8/2001 |
| WO | WO 03/058519 A2 | 7/2003 |
| WO | WO 03/067497 A1 | 8/2003 |

OTHER PUBLICATIONS

Apple Computer Inc, Mail 1.3.3. Help: Checking Spelling in Email, http://docs.info.apple.com/article.html?artnum=151474, Feb. 18, 2004, 1 page.
Courter et al., Mastering Microsoft Office 2000—Professional Edition, 1999 published by Sybex Inc., pp. 36-37 and 92-94.
Courter et al., Mastering Microsoft Office 2000—Professional Edition, 1999 published by Sybex Inc., p. 5.
O'Hara, Easy Microsoft Outlook 2003, Que, Sep. 18, 2003, 44 pages.
Russell et al., Special Edition Using Microsoft Office Outlook 2003, Que, Sep. 25, 2003, 102 pages.
Syroid et al., Outlook 2000 in a Nutshell, O'Reilly Media, May 2, 2000, pp. 1-66.
Tobias, Dan's Mail Format Site, Aug. 3, 2003, http://web.archive.org/web/20030820225908/http://mailformat.dan.info/config/yahoo.html, 6 pages.
International Search Report and Written Opinion for international application No. PCT/US2005/010137, mailed Jun. 3, 2005. (Related application).
Comer, D. and Peterson, L., "Conversation-Based Mail," ACM Transactions on Computer Systems (TOCS) vol. 4, Issue 4, pp. 299-319, Nov. 1986.
Bellotti, V et al., (2003), "Taking Email to Task: the design and evaluation of a task management centered email tool." In Conference Proceedings on Human Factors in Computing Systems (CHI2003), pp. 345-352, Apr. 5-10, 2003, Fort Lauderdale, Florida.
Bellotti, V. et al., "Taskmaster: recasting email as task management," PARC, CSCW '02 Workshop on Redesigning Email for the 21st Century.
Flores, F. et al., "Computer Systems and the design of organizational interaction," ACM Transactions on Information Systems., pp. 153-172, (1988).
Shepherd, A. et al., "Strudel—an extensible electronic conversation toolkit," Proceedings of the 1990 ACM Conference on Computer-supported Cooperative Work, Los Angeles, California, United States, pp. 93-104.
Venolia, G., et al., "Supporting Email Workflow," Technical Report MSR-TR-2001-88, Microsoft Corporation, 10 pages (Sep. 2001).
Winograd, T., (1987), "A language/action perspective on the design of cooperative work," Human-Computer Interaction, vol. 3 No. 1, pp. 3-30, (1987-1988). Earlier version presented at the Conference on Computer-supported Cooperative Work, Austin, pp. 203-220, Dec. 1986.
Winograd, T., "Where the Action is," pp. 256A-260A, Byte, Dec. 1988.
Zawinski, J., "Message Threading," http://www.jwz.org/doc/threading.html, pp. 1-9 (1997-2000).
Apple Computer Inc., Mac Mail Utility Screenshot, Aug. 18, 2004, 1 page.
International Preliminary Report on Patentability, PCT/US2005/006826, Oct. 4, 2006, 4 pages.
International Search Report and Written Opinion, PCT/US05/06826, Jun. 26, 2006, 7 pages.

Screenshot of reply to message in Lotus Notes 6.5, Apr. 8, 2006, 1 page.
Supplementary European Search Report, EP Application 05724384.2, Mar. 18, 2009, 5 pages.
Google Inc., Office Action, Australian Patent Application No. 2011201989, Apr. 12, 2012, 3 pgs.
Google Inc., Office Action, Australian Patent Application No. 2011201993, Feb. 28, 2012, 2 pgs.
Google Inc., Office Action, Australian Patent Application No. 2011201994, Mar. 8, 2012, 2 pgs.
Lawrence, Context and Page Analysis for Improved Web Search, IEEE Internet Computing, Jul.-Aug. 1998, pp. 38-46.
Google Inc., Office Action, Australian Patent Application No. 2011201991, Mar. 8, 2012, 2 pgs.
Tyson, Sams Teach Yourself Microsoft Outlook 2000 in 24 Hours, 1999, 2 pgs.
Google Inc., European Search Report, EP 11172427.4, Dec. 21, 2011, 6 pgs.
Google Inc., Office Action, AU 2011203058, Oct. 31, 2011, 1 pg.
Google Inc., Office Action, CN 200580016413.8, Dec. 19, 2011, 3 pgs.
Google Inc., Office Action, KR 2011-7017094, Sep. 26, 2011, 5 pgs.
Google Inc., Office Action, KR 2011-7017095, Sep. 29, 2011, 5 pgs.
Google Inc., Office Action, KR 2011-7017096, Oct. 4, 2011, 4 pgs.
Google Inc., Office Action, KR 2011-7017098, Oct. 4, 2011, 3 pgs.
Google Inc., Office Action, KR 2011-7017102, Oct. 4, 2011, 4 pgs.
Google, Office Action, KR 2006-7022840, Jan. 26, 2012, 4 pgs.
Resnick, Network Working Group, RFC 2822, Apr. 2011, 65 pgs.
Google Inc., Notice of Acceptance, AU 2011203058, Jan. 6, 2012, 3 pgs.
Bitmap Index, Internet Citation, 2009, 5 pgs, en.wikipedia.org/wiki/Bitmap_index.
Google Inc., ISR/WO, PCT/US2012/046876, Feb. 22, 2013, 12 pgs.
Navarro, Indexing and Searching, Modern Information Retrieval, Ch. 8, Jan. 1, 1999, pp. 191-228.
Ogilvie, Experiments with Language Models for Known-Item Finding of Email Messages, TREC 2005, Nov. 15-18, 2005, 10 pgs.
Elsas, Retrieval and Feedback Models for Blog Feed Search, SIGIR '08, Jan. 1, 2008, 8 pgs.
Google Inc., ISR/WO, PCT/US2012/046872, Sep. 28, 2012, 11 pgs.
Google Inc., European Search Report, EP 12183097.0, Nov. 5, 2012, 7 pgs.
Google Inc., European Search Report, EP 12183103.6, Nov. 5, 2012, 7 pgs.
Google Inc., Office Action, AU 2011201992, Aug. 16, 2012, 3 pgs.
Google Inc., Office Action, AU 2011201993, Oct. 11, 2012, 3 pgs.
Google Inc., Office Action, CN 200580016413.8, Jul. 2, 2012, 3 pgs.
Google Inc., Office Action, EP 05724384.2, Nov. 23, 2012, 7 pgs.
Google Inc., Office Action, in 1262/MUMNP/2006, Sep. 27, 2011, 4 pgs.
Google Inc., Office Action, JP 2010-275595, Jul. 6, 2012, 4 pgs.
Google Inc., Office Action, JP 2011-181202, Aug. 29, 2012, 3 pgs.
Google Inc., Office Action, JP 2011-181203, Aug. 27, 2012, 3 pgs.
Google Inc., Office Action, JP 2011-181204, Aug. 27, 2012, 3 pgs.
Google Inc., Office Action, JP 2011-181205, Aug. 29, 2012, 4 pgs.
Lin, Modeling Semantics and Structure of Discussion Threads, WWW'09, Jan. 1, 2009, 1 pg.
Miura, Rapid Search for a Target Webpage, To Master V8, N11, Jun. 1, 2003, 8 pgs.
Reaction, Improving Search Technique for the Internet, May 1, 2003, 6 pgs.
Seo, Online Community Search Using Conversational Structures, V14, N6, Apr. 23, 2011, 25 pgs.
Google Inc., Office Action, CN 200580016413.8, Dec. 4, 2012, 6 pgs.
Google Inc., Decision to Grant a Patent, JP 2011-181202, Mar. 7, 2013, 1 pg.
Google Inc., Decision to Grant a Patent, JP 2011-181203, Mar. 11, 2013, 1 pg.
Google Inc., Decision to Grant a Patent, JP 2011-181204, Mar. 11, 2013, 1 pg.
Google Inc., Extended European Search Report, EP 12192299.1, Mar. 6, 2013, 7 pgs.

(56) References Cited

OTHER PUBLICATIONS

Google Inc., Notice of Acceptance, AU 2011201989, Oct. 27, 2012, 3 pgs.
Google Inc., Notice of Acceptance, AU 2011201993, Mar. 21, 2013, 3 pgs.
Google Inc., Office Action, JP 2011-181205, Mar. 11, 2013, 4 pgs.
Autonomy webpage, http://autonomy.com, 2004, 1 pg.
Cordess, Taking a Look at Zoe, Google Your Email, Apr. 26, 2004, 1 pg.
eCommerce Customer Service: Email Management Systems that Work, eGain Corporation White Paper, 1998, 9 pgs.
Electronic Discovery Solutions from DolphinSearch, www.dolphinsearch.com, 2003, 1 pg.
Enfish webpage, www.enfish.com, 2004, 1 pg.
Flenner, Replace Those Shared Drives With Space Drives, O'Reilly on Java.com, Aug. 28, 2002, 7 pgs.
Friedman, The Dashboard, 2003, 2 pgs.
Gelernter, Expert Voice: David Gelernter on Knowledge Management, Cioinsight Oct. 10, 2002, 6 pgs.
Google Inc., ISR/WO, PCT/US2005/031920, May 3, 2006, 3 pgs.
Kanellos, Microsoft Aims for Search on Its Own Terms, c/net News.com, Nov. 24, 2003, 4 pgs.
Lotus Discovery Server webpage, lotus.com/product/disccserver.nsf, 2004, 1 pg.
My Take on Dashboard: Multiple Desktops Done Differently, engadgeted.net, Jul. 23, 2004, 2 pgs.
Opera Mail Client, Opera M2 webpage, www.opera.com/products/desktop/m2, Jun. 2004, 3 pgs.
Placeless Documents, Xerox Corporation, www2.parc.com/csl/projects/placeless, 1999, 2 pgs.
Rohall, Email Visualizations to Aid Communications, IEEE Symposium on Information Visualization (InfoVis), 2001, pp. 1-4.
Searching ZoeDocs, zoe.omara.ca/index.ph?page=searching, Dec. 2003, 3 pgs.
The Apache Jakarta Project, jakarta.apache.org/lucene/docs/indes.htlm, 2004, 1 pg.
Udell, Googling Your Email, O'Reilly Network, Oct. 7, 2002, 4 pgs.
Venolia, Understanding Sequence and Replay Relationships within Email Conversations: A Mixed-Model Visualization, CHI 2003, Ft. Lauderdale FL, Apr. 5-10, 2003, pp. 361-368.
What Does Autonomy Do?, http://www.autonomy.com/content/home, 2003, 5 pgs.
X1 About Us, www.x1.com/abou_us/, 2004, 1 pg.
X1 Enterprise Edition product page, www.x1.com/?PROGOOG, 2004, 2 pgs.
ZoeDocs, http://zoe.omara.ca/LikeZoe, Nov. 2003, 1 pg.

\* cited by examiner

EMAIL CONVERSATION MANAGEMENT SYSTEM

RELATED APPLICATIONS

This application is a divisional of U.S. application Ser. No. 10/816,427, filed Mar. 31, 2004, now U.S. Pat. No. 7,814,155 entitled "Email Conversation Management System," which is incorporated by reference herein in its entirety.

This application is also related to U.S. application Ser. No. 12/892,839, filed Sep. 28, 2010, entitled "Email Conversation Management System," which is incorporated by reference herein in its entirety.

FIELD OF THE INVENTION

The present invention relates generally to the field of a client-server computer network system, and in particular, to a system and method for a user to manage a large number of messages in an efficient and user-friendly manner.

BACKGROUND OF THE INVENTION

Every day, people send and receive millions of email (also written as "e-mail") messages over computer networks for business and leisure. Email, being convenient, easy to use and close to instantaneous in many cases, has become an extremely popular communication channel for people to exchange information.

Traditionally, email messages arriving at a user's email account are displayed by a dedicated email client or in web browser window individually, in a chronological order, e.g., the most recent message appears at top of the browser window while the oldest one appears at the bottom of the browser window. However, it is common that multiple messages sent by two or more people at different times may cover a same topic. Viewing the messages together would assist the user in understanding the individual messages in the proper context.

It would be highly desirable to have a system and method of organizing and displaying a plurality of messages, including messages received by and messages sent by a user, according to their respective topics. It would also be highly desirable that all the messages relating to a same topic, and that form part of same conversation, be presented intuitively so that the user is able to identify a particular message submitted by a specific sender efficiently, and so that the user can see the messages in the conversation in their context with respect to other messages in the conversation.

SUMMARY

In one embodiment, a method of searching messages includes receiving a search query and identifying a first message relevant to the search query. The first message belongs to a conversation that includes at least a second message. The conversation is returned as a search result to the search query.

In another embodiment, a method of searching messages includes searching a message repository to identify one or more messages relevant to a search query. Each identified message is associated with a respective conversation out of a plurality of conversations and each conversation comprises one or more messages and has a respective conversation identifier. The respective conversation identifiers associated with one or more identified messages are identified and a list of one or more conversations is created where each of the conversations in the list corresponds to a respective identified conversation identifier. At least a portion of the list of one or more conversations is produced as the search result.

BRIEF DESCRIPTION OF THE DRAWINGS

The aforementioned features and advantages of the invention as well as additional features and advantages thereof will be more clearly understood hereinafter as a result of a detailed description of preferred embodiments of the invention when taken in conjunction with the drawings.

Like reference numerals refer to corresponding parts throughout the several views of the drawings.

DESCRIPTION OF EMBODIMENTS

The present invention is directed to a client-server system and corresponding method of organizing and displaying messages sent to and by a user.

Figure 1:
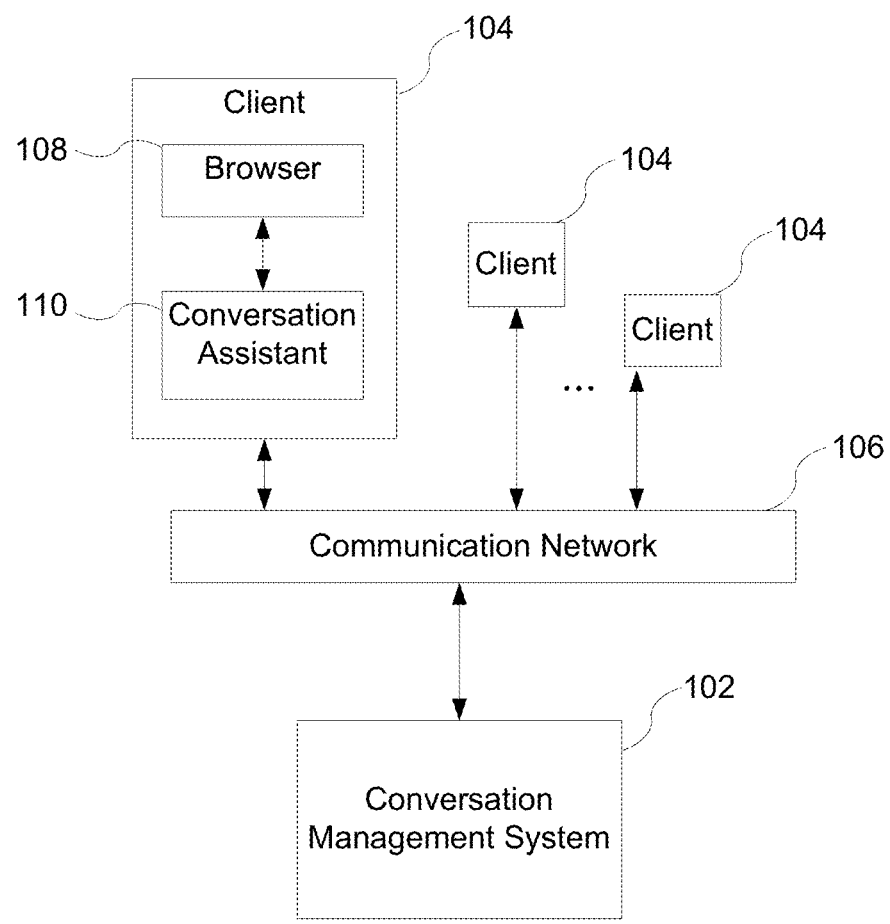
FIG. 1 schematically illustrates one embodiment of the client-server based network system according to the present invention.

FIG. 1 schematically illustrates one embodiment of the client-server system. The system includes a conversation management system 102, a communication network 104 and a plurality of clients 104. A conversation includes one or more relevant messages covering a conversation topic. As will be described below, additional criteria, beyond the conversation topic, may be used to determine which messages are part of each distinct conversation. The senders and recipients of the messages are participants of the conversation. All the messages directed to a user of the conversation management system 102 are grouped into a plurality of conversations and presented to the user in a conversation-based format, individually or jointly. More detailed discussion about the implementation of the conversation management system 102 is provided below.

A client 104 includes a browser 108 and a conversation assistant 110. The browser 108 can be a general purpose Internet browser (sometimes called a Web browser) having a browser window used for displaying the conversations, or it can be a dedicated browser application having a window for displaying conversations. The conversations and messages in the conversations may be rendered by the browser 108 using the hypertext markup language (HTML) or any other appropriate rendering methodology. After a user submits a request through the browser 108 to the conversation management system 102 to access messages stored in his personal account, the conversation management system 102 identifies a plurality of conversations in the user's personal account according to the user's request and transfers them as well as a set of display instructions back to the client 104. The conversation assistant 110, in response, generates one or more forms following the display instructions, each form including information of some of the conversations. The forms are then submitted to and rendered by the browser 108. In another embodiment, the conversation assistant 110 may alternatively exist and operate in the conversation management system 102.

Figure 2:
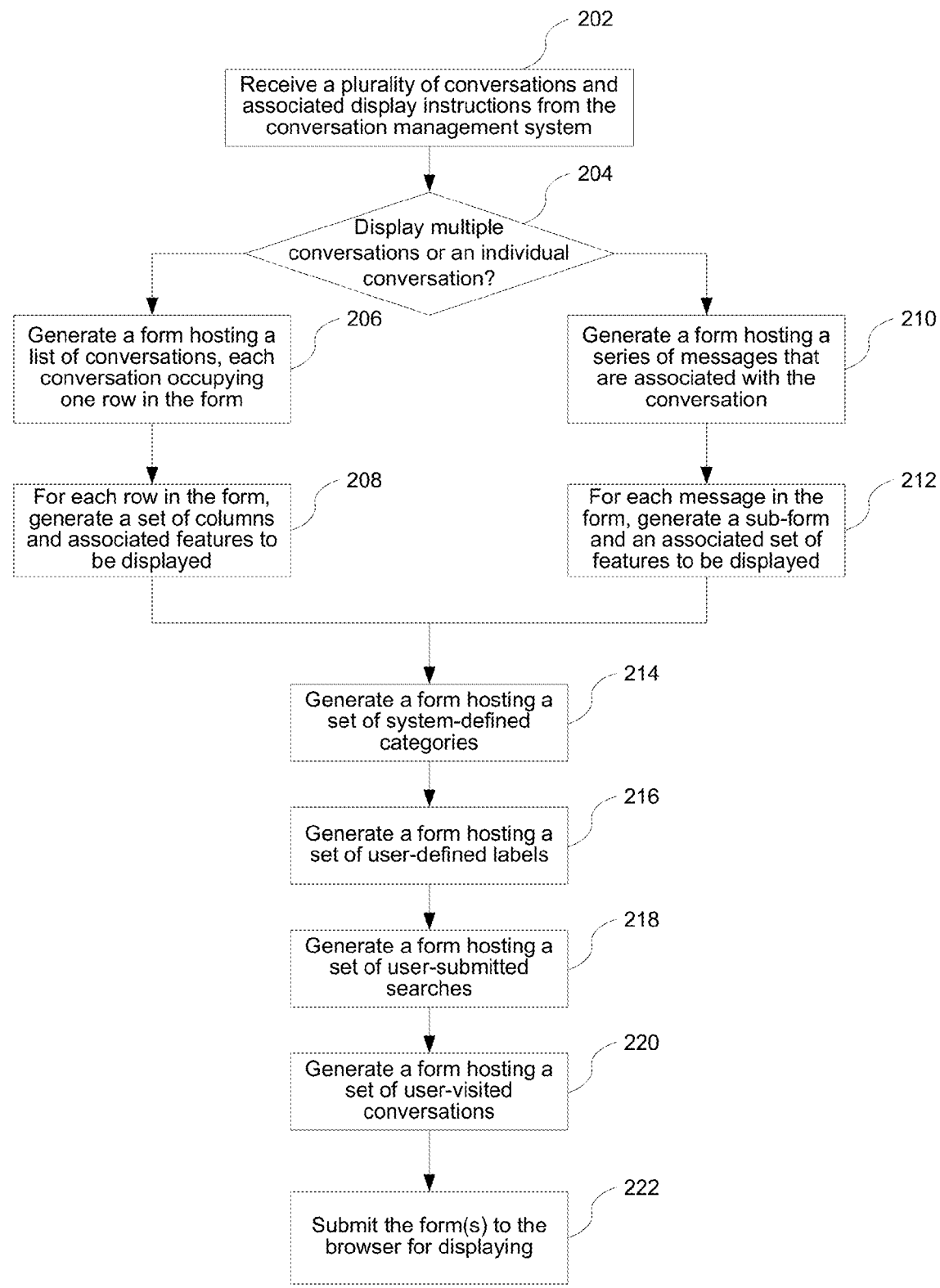
FIG. 2 is an overview flowchart illustrating how a conversation assistant generates the various forms for displaying the conversations provided by a conversation management system.

FIG. 2 is an overview flowchart illustrating how the conversation assistant 110 generates various forms for displaying conversations provided by the conversation management system 102. After receiving a plurality of conversations and associated display instructions at step 202, the conversation assistant 110 determines, at step 204, whether the user has requested multiple conversations or an individual conversation. If the user asks for multiple conversations, the conversation assistant 110, at step 206, generates a form that hosts a list of conversations, each conversation occupying one row in the form. For each row in the form, the conversation assistant 110 also generates a set of columns and associated features to be displayed according to the display instructions at step 208. More details on how the information in the columns and associated features are rendered are provided below in conjunction with FIGS. 3A and 3B.

If the user requests an individual conversation, the conversation assistant 110 then generates a distinct form hosting a series of messages that are associated with the conversation at step 210. At step 212, the conversation assistant 110 generates a sub-form and an associated set of features to be displayed for each message following the corresponding display instructions. More details on how the conversation assistant renders such sub-forms and associated features are provided below in conjunction with FIGS. 6A-6D.

After generating a form hosting a list of conversations or an individual conversation, the conversation assistant 110 generates a form hosting a set of system-defined categories at step 214. Each system-defined category may be associated with zero or multiple conversations. In one embodiment, a system-defined category is an attribute that the conversation management system 102 assigns to a conversation either in response to a user action or when predefined criteria are met. For instance, the system associates a "trash" attribute with a conversation when the user marks the conversation for deletion, but has not yet taken the steps required to permanently remove the conversation from the user's mail account. More specifically, the conversation management system 102 attaches the attribute "trash" to the conversation and removes an existing attribute, e.g., "inbox", from the conversation, if necessary. It is noted that certain system-defined categories may be mutually exclusive. In another example, the system may automatically associate an "InBox" attribute and an "Unread" attribute with a newly received incoming message. A more detailed discussion of the system-defined categories is provided below in conjunction with FIGS. 4A and 4B.

Next, the conversation assistant 110 generates another form hosting a set of user-defined labels at step 216. FIG. 3B shows a group box 347 in which this form is displayed. Each user-defined label may be associated with zero or multiple conversations. In one embodiment, a user-defined label is an attribute that can be associated with specified conversations. The conversations to which the user-defined label is assigned may be determined by specific user actions or by the operation of a filter or similar mechanism. Unlike the system-defined categories, these labels are defined by the user arbitrarily and they are not mutually exclusive. In other words, a conversation can be associated with multiple labels at the same time. For example, there may be two labels, "shopping list" and "Thanksgiving," in a user's personal account. The label "shopping list" may be assigned by the user, or by a filter set up by the user, to shopping-related conversations, while the label "Thanksgiving" may be assigned to conversations regarding Thanksgiving activities, including Thanksgiving shopping. Since a label is defined by a user, the user can also delete the label. A more detailed discussion of user-defined labels is provided below in conjunction with FIGS. 5A and 5B. With respect to group box 347, when the user selects (e.g., clicks on) a user-defined label in group box 347, the conversation assistant 110 submits to the conversation management system a query to locate conversations associated with the user-selected label. That query is then executed and the user is presented with a listing of such conversations, if any.

The conversation management system 102 and the conversation assistant 110 work together to allow a user to search the messages in the user's mail account and to present the search results in a highly intuitive fashion. The conversation management system 102 extracts information from the user's email account or processes a message being composed by the user, while the conversation assistant 110 renders the information prepared by the conversation management system 102. In other embodiments a different division of duties between the conversation management system 102 and the conversation assistant 110 may be used. Because many of the tasks performed by the system can be performed by either the conversation management system 102 or the conversation assistant 110 or by the two working together, these two components are sometimes herein referred to jointly as the "conversation system."

The conversation system (102 and/or 110) may generate a form hosting a set of searches submitted by the user at step 218 so that the user can revisit (or more accurately, regenerate) recent search results. A more detailed description of search-based conversation list generation is provided below in conjunction with FIGS. 7A-7C. Additionally, the conversation system may generate a form (e.g., the form displayed in group box 348 in FIG. 3B) hosting a set of conversations visited by the user recently at step 220. This feature is analogous to the back button of a web browser. At step 222, the conversation assistant 110 submits the forms to the browser 108 for displaying.

Steps 214 through 220 may be performed in many possible orders other than the order shown in FIG. 2. In some embodiments, some of these form generating steps may be omitted.

Generating List of Conversations

Figure 3A:
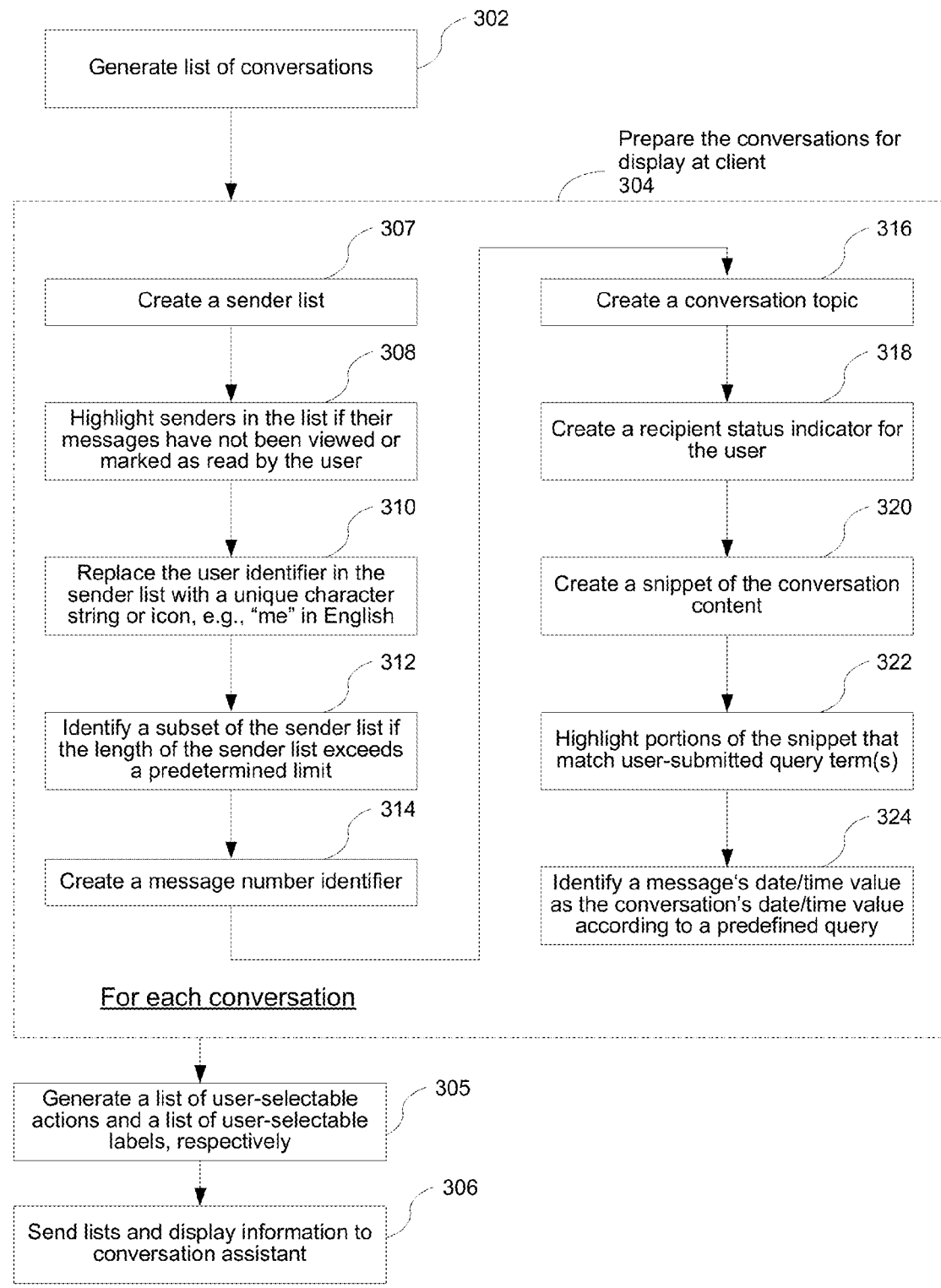
FIG. 3A is a flowchart illustrating how the conversation assistant generates a form hosting a list of conversations.
Figure 3B:
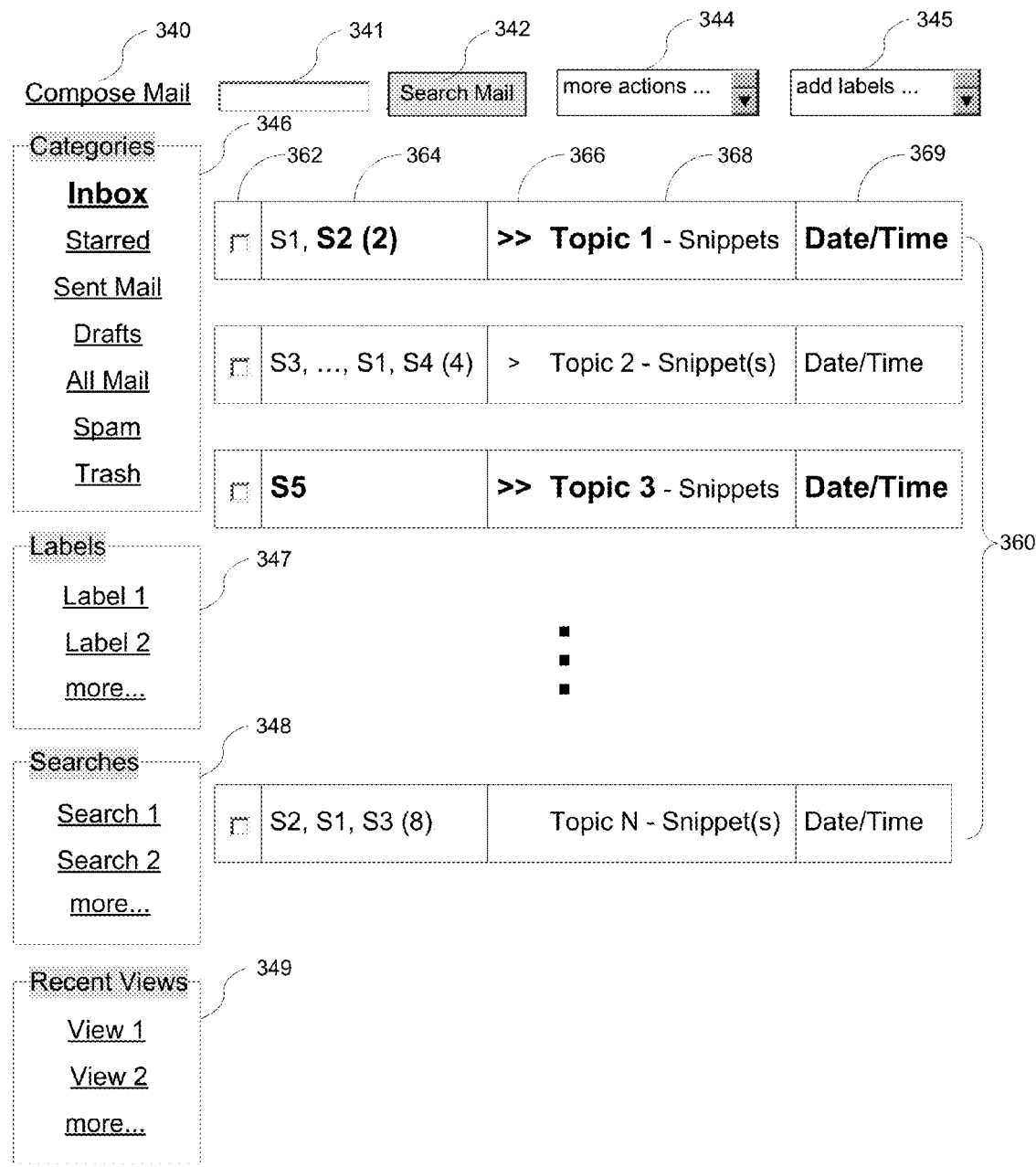
FIG. 3B is a schematic screenshot of a list of conversations in the "inbox" category according to one embodiment of the present invention.

Referring now to FIG. 3A, the conversation management system 102 generates a list of conversations (step 302), for instance in response to the user or client requesting an inbox view of the user's mail account. As will be explained in more detail below, lists of conversations are generated by performing a search of the user's mail account. To generate the list of conversations for an inbox view, the user's mail account is searched for conversations associated with an "InBox" attribute (sometimes called a label). The conversation management system 102 then prepares information about those conversations for display at step 304, as will be described in more detail next. In addition, the conversation management system generates a list of user-selectable actions and a list of user-selectable labels at step 305. The user-selectable labels may include system-defined labels as well as user-defined labels. The discussion below in connection with FIGS. 4 and 5 illustrates the usage of these user-selectable lists. The resulting information is then sent to the conversation assistant for rendering at step 306.

At step 304, the conversation management system 102 repeatedly conducts a series of steps (from step 306 to step 324) to generate a set of fields for each conversation in the list of conversations. In some embodiments, these fields may be rendered by the conversation assistant 110 in columns to enable a user to easily scan the conversation list.

For each conversation and an associated set of messages, the conversation management system 102 first generates a sender list at step 307. The sender list comprises a plurality of sender identifiers, each identifier corresponding to a sender who has authored at least one of the messages. A sender may be identified by his first name, last name, full name, email address, picture or a unique icon or a combination thereof. If a sender has authored multiple messages in the conversation, his identifier nevertheless appears only once in the sender list. In one embodiment, the sender identifiers in the list are ordered according to their respective messages' arrival time at the system 102. In another embodiment, the sender identifiers in the list are ordered alphabetically according to their respective names. Next, the conversation management system 102 formats the sender list so as to highlight one or more sender identifiers in the list according to the display instructions at step 308. The term "highlight" is used here to mean displaying in a visually distinctive manner, such as bolding, underlining, changing background color, changing font color, changing the font, etc. Furthermore, in this context, the term "highlight" means generating formatting information for displaying something (e.g., a specified portion of text) in a distinctive manner. For example, in some embodiments, a sender's name is formatted to be displayed in boldfaced characters if his message has not been viewed or marked as read by the user.

In some embodiments, the conversation assistant receives or has access to pictures of one or more of the people listed in the sender list and/or recipient lists of conversations. When the user views either a list of conversations or an individual conversation, and positions a cursor over a name or identifier in the sender list, a picture of that sender is displayed. In some embodiments, the same functionality is provided, when viewing a conversation, for listed message recipients. This feature may be particularly useful for email systems used by large organizations.

In some embodiments, if the user himself has authored at least one message in the conversation, the conversation management system 102 replaces the user's name or other identifier in the sender list with a unique character string or icon or other output cue for him as his identifier in the sender list at step 310. One option for the unique character string is a self-referencing identifier in a particular language. For example, the pronoun "me" in English can be used for representing the user in the sender list. This feature is more useful than identifying the sender by his first name in the sender list (which, of course, may be done in alternate embodiments), since many people share the same first names. Representing the user by a unique identifier also helps the user to easily identify the conversations in which he has actively participated by contributing at least one message.

If many people have contributed messages to a conversation, the sender list may become too long to fit into the limited space in a browser window. This is especially true if one or more of the senders in the sender list are identified by their email address. If so, the conversation management system 102 identifies a subset of the sender list to display in the browser window at step 312. In one embodiment, the subset includes at least the sender of a last message in the conversation and, where applicable, the sender of a message that has not been viewed or marked as read by the user. In some embodiments, when the sender list identifies only a subset of the message senders in the conversation the sender list includes an ellipsis mark " . . . " or other symbol indicating that the sender list is incomplete. In some embodiments, where there is more than one sender whose messages have not been viewed or marked as read by the user, the subset identifies as many of those senders as allowed by the available space.

At step 314, the conversation management system 102 creates a message number indicator for the conversation, indicating the number of messages in the conversation, excluding messages permanently deleted or marked for deletion. The message number indicator may be a number in a pair parentheses, e.g., "(3)" represents that there are three messages in the conversation. In some embodiments, when a conversation includes only one message, a message number is not generated for the conversation. The message number indicator can also be an icon. The icon can be color coded to provide additional information, e.g., to indicate how many messages in the conversation remain unread (i.e., not viewed or marked as read). Next, the conversation management system 102 generates a conversation topic for the conversation being processed, at step 316. Typically, the conversation topic is the subject of the first message in the conversation or a truncated version of the subject if it exceeds a predefined length. In one embodiment, if the conversation includes at least one message having the Unread attribute, both the message number identifier and the conversation topic are highlighted in the browser window to attract the user's attention. In another embodiment, only the conversation topic is highlighted to indicate one or more unread messages.

According to an established email standard, a message can be sent to at least three classes of recipients, one primary class of recipients whose addresses are listed in the "To:" field and two secondary classes of recipients whose addresses are listed in the "Cc:" field or the "Bcc:" field. Accordingly, the conversation management system 102 at step 318 creates a recipient status indicator for the user, which is another indicator of the user's participation in the conversation. In one embodiment, a conversation in which the user is a primary recipient of any message is marked with a first distinctive indicator, such as ">>", a conversation in which the user is a secondary recipient of at least one message and is not a primary recipient of any messages is marked with a second distinctive indicator, such as ">", and a conversation in which the user is not explicitly listed as a recipient of any message (e.g., because the messages were sent to a group or mailing list) receives no special marks. In other embodiments, conversations in which the user is a primary recipient of at least one message and conversations in which the user is only a secondary recipient may be represented in other visually distinctive ways, such as by highlighting one or more portions of the rows representing these conversations.

In some embodiments, the conversation management system 102 creates a snippet of the conversation at step 320. The snippet provides the user with a preview of the contents of the conversation without the user having open the conversation. In one embodiment, the snippet is generated from the most recent message in the conversation. In another embodiment, the snippet is extracted from the first message (i.e., the oldest message) in the conversation. In yet another embodiment, the snippet is extracted from all the messages in the conversation according to predefined heuristic rules, e.g., listing a set of keywords appearing most frequently in the conversation. If the conversation management system 102 is preparing a list of conversations in response to a search submitted by the user, it creates a snippet including a highlighted portion that matches the user-submitted query terms at step 322, which may be similar in one or more respects to the snippets included search results returned by a search engine such as the Google™ (trademark of Google Inc.) search engine.

Finally, the conversation management system 102 identifies a date/time value for a conversation at step 324. This date/time value often dictates the display order of a list of conversations in the browser window. In some embodiments, each conversation in a list of conversations, is assigned a date/time equal to the date/time of the most recent message that matches the search criteria used to generate the list of conversations. For instance, if a user-specified search query is used (e.g., "Lake Tahoe"), then for each matching conversation in the list of conversations, the assigned date/time is the date/time of the most recent message matching the user-specified search query. In another example, if the search criteria is "Inbox" (i.e., conversations having at least one message assigned the Inbox label), then the date/time assigned to each conversation in the list of conversations is the date/time of the most recent message that is associated with the Inbox label. In some embodiments, the conversations in the list of conversations are listed in reverse chronological order with respect to their assigned date/time values (i.e., with the most recent conversations being listed first).

In other embodiments, other methods or criteria may be used to assign a date/time to each conversation in a list of conversations, and other methods may be used to order the conversations in accordance with their date/time values. For instance, in some embodiments, when using an advanced search query tool, the user is given the option of searching for conversations whose date/time falls within a specified time window (and that meet other user-specified search requirements, if any). The resulting list of conversations is listed in accordance with the length of time between a user specified target date or target date/time and the date/time of each conversation in the list. Thus, conversations before and after the target date or date/time may be interleaved in the resulting list of conversations.

FIG. 3B is a schematic screenshot of a list of conversations in the "inbox" category according to one embodiment of the present invention. At the top left corner of the screenshot, there is a "Compose Mail" link 340. The user clicks on this link to start writing a new message. Next to the link 340, there are a textbox 341 and a "Search Mail" button 342. After the user submits one or more query terms through the textbox 341 and then clicks on the "Search Mail" button 342, the system generates a new display lists conversations matching the query terms. Please refer to FIGS. 7A and 7B for details. Next to button 342 are two pull-down lists: the "more actions" list 344 and the "add label" list 345. Please refer to FIGS. 4 and 5, respectively, for more details about these two pull-down lists. Right below the "Compose Mail" link 340, there are a series of group boxes, each box corresponding to a form generated by one of the steps 214-220 in FIG. 2. For instance, the group box 346 displays system-defined categories, including "Inbox", "Starred", "Sent Mail", "Drafts", "All Mail", "Spam" and "Trash", etc. In other embodiments, the set of system-defined categories may be different, including a subset of these categories and/or additional categories. In some embodiments, the "Starred" category includes conversations in which the user plans to be actively involved, e.g., by sending messages to other participants, which is similar to a "To Do" list. Thus, in one embodiment, a message may be flagged with a star, so that a user can, for example, search for starred messages. In one embodiment, the "All Mail" category includes all the conversations that are not in the "Spam" or "Trash" categories. Note that since the current screenshot displays only conversations belonging to the "Inbox" category, the corresponding link in the group box 346 has been highlighted.

The main area of the schematic screenshot in FIG. 3B is a form comprising a list of conversations 360, each conversation occupying one row in the form. Each row further includes a checkbox 362, a sender list 364, a recipient status indicator 366, a conversation topic and snippets 368 and a date/time value 369. In other embodiments, the set of fields for each conversation row may be different, including a subset of these fields and/or additional fields. The checkbox 362 is checked by the user if the user decides to move the corresponding conversation from one system-defined category, e.g., "Inbox", to another one, e.g., "Trash", or if the user decides to attach a user-defined label to the corresponding conversation. The definitions of other columns or fields in the form have been given above in conjunction with FIG. 3A. Note that there are two messages in the first conversation and a sender S2 has been highlighted in the first row, suggesting that the message sent by S2 has not yet been read or marked as read. In contrast, the second conversation includes four messages that have all been read or marked as read and therefore nothing is highlighted in the second row.

Though not shown, in one embodiment, the browser window represented by FIG. 3B includes a persistently displayed message compose area, associated addressing and subject fields, and other options and fields that might typically be associated with a form that allows composing and sending a message. Such an area, for example, is displayed below the list of conversations 360. Thus, in one embodiment, within a single user interface (e.g., a browser window), a user may have the option to view a list of conversations and also compose a new message without being required to open a new window (e.g., a message compose window) and without removing the list of conversations from the current browser window.

Figure 4A:
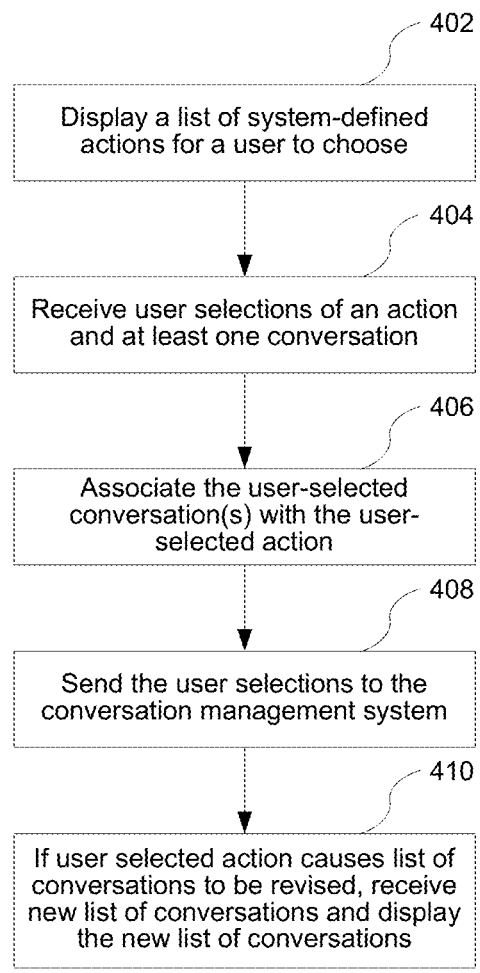
FIG. 4A is a flowchart illustrating the operation of the "more actions" pull-down list.

FIG. 4A is a flowchart illustrating the operation of the "more actions" pull-down list 344. After a user clicks on the pull-down list, the browser displays a list of system-defined actions at step 402. The user selects a particular action in the pull-down list and at least one conversation in the conversation list at step 404. The browser then associates the user-selected conversations with the user-selected actions at step 406 and sends them back to the conversation management system for further processing at step 408. If the user selected action causes the user-selected conversations to be removed from the previously displayed list of conversations, the conversation assistant receives a new list of conversations from the conversation management system, and the conversation assistant displays the new list of conversations in the browser at step 410.

Figure 4B:
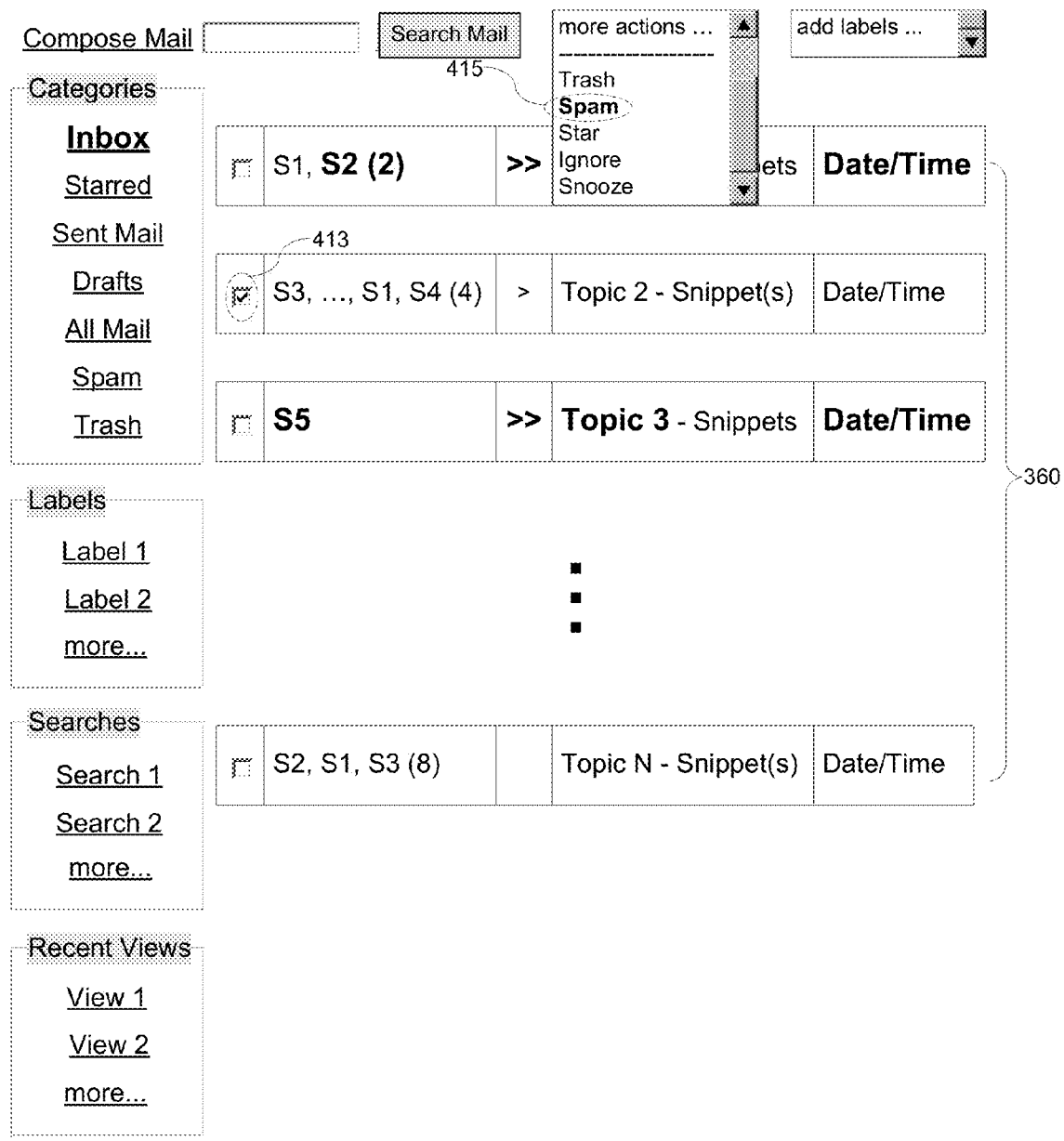
FIG. 4B is a screenshot of how a user moves a conversation from one category to another using the "more actions" pull-down list.

Referring to FIG. 4B, shows a change from the schematic screenshot of FIG. 3B that results when the user checks the checkbox 413 of the second conversation, clicks on the "more actions" pull-down list, and picks the item "spam" 415. As a result, the second conversation will be removed from the "Inbox" category and the "Spam" category will have a new member. Note that some of the actions in the pull-down list such as "Ignore" and "Snooze" do not have a corresponding category. Both "Ignore" and "Snooze" correspond to the "All Mail" category. Specifically, when the user checks the checkbox of a conversation and then clicks on the "Ignore" item, the conversation will be transferred to the "All Mail" category. If any new message associated with the "ignored" conversation arrives, the system still associates the new message with the conversation, but it does not bring the conversation back to the user's attention automatically. However, the user can stop ignoring the conversation and bring it back into the "Inbox" category by visiting the "All Mail" category, checking the checkbox of the ignored conversation, and then selecting the "Inbox" item in the corresponding "more actions" pull-down list. As indicated by this example, different categories' pull-down lists may have different sets of action items. The "Snooze" action item allows the user to ignore a conversation temporarily by setting a triggering condition, which can be time-driven, e.g., a conversation should disappear from the "Inbox" category for one week and then come back automatically, or event-driven, e.g., a conversation should not come back to the "Inbox" category until the number of unchecked messages has reached a predetermined limit, or a particular person has contributed a message to the conversation, or a message is received that specifies the user as a primary recipient.

Categorizing Conversations

Figure 5A:
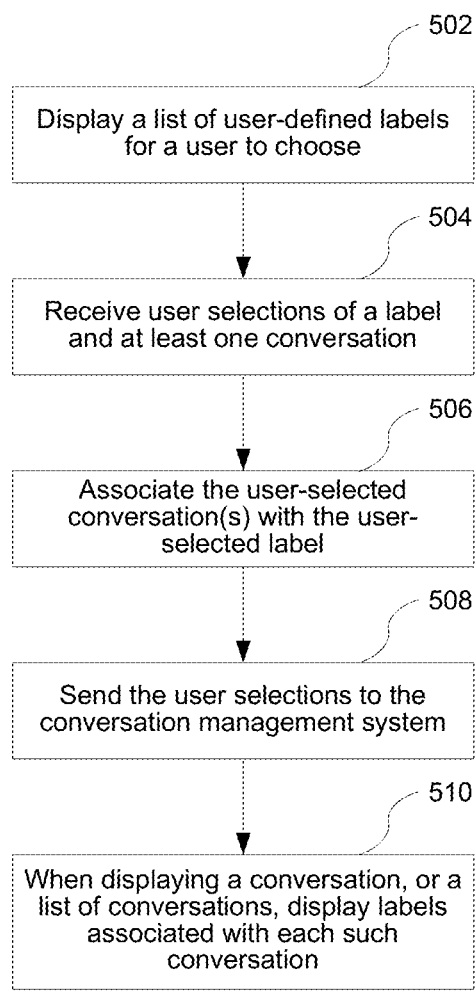
FIG. 5A is a flowchart illustrating the operation of the "add labels" pull-down list.

FIG. 5A is a flowchart illustrating the operation of the "add labels" pull-down list 345. After a user clicks on the pull-down list, the browser displays a list of user-defined labels for him to choose at step 502. The user selects a particular label in the pull-down list and at least one conversation in the conversation list at step 504. The browser then associates the user-selected conversations with the user-selected label at step 506 and sends them back to the conversation management system for further processing at step 508. As a result, a list of the conversations associated with the user-selected label will include the conversations associated with that label in step 510. As described in more detail below, when a label or attribute is associated with a conversation, one or more entries are added to an index 1710 (FIGS. 17, 18) to enable searches for conversations bearing that label to be located. In some embodiments, the label or attribute is also added to one or more entries in a conversation database 1808 (FIG. 18). In some embodiments, the labels associated with a conversation are displayed when the user views the conversation. In some embodiments, the labels associated with each conversation in a list of conversations are displayed in the row of information provided for each conversation in the list.

Figure 5B:
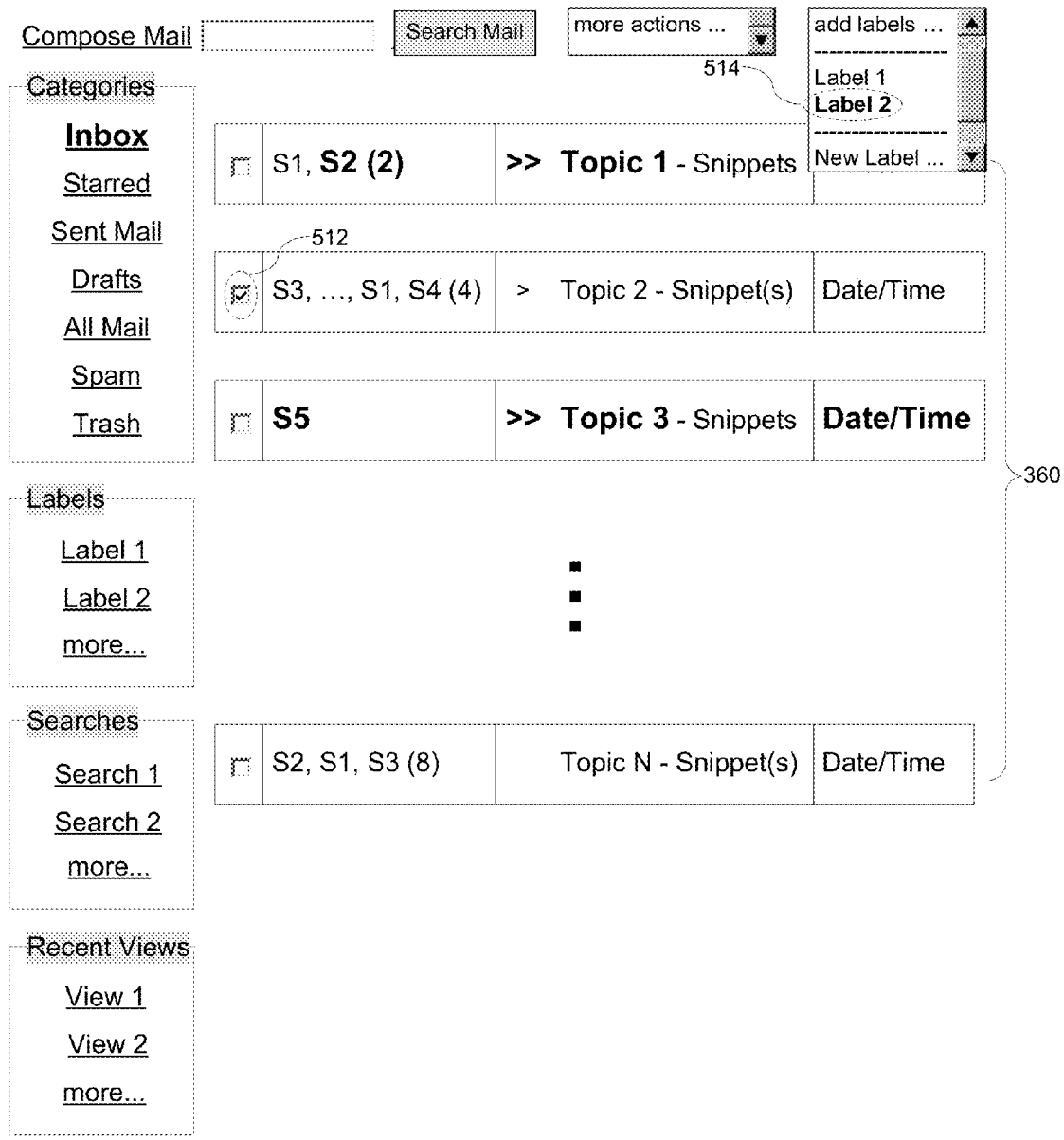
FIG. 5B is a screenshot of how a user adds a label to a conversation using the "add labels" pull-down list.

FIG. 5B is a schematic screenshot showing the browser window resulting when the user checks the checkbox 512 of the second conversation and then clicks on the "add labels" pull-down list and picks the item "Label 2" 514. (It is noted that "Label 2" represents a user specified label name.) This will cause "Label 2" to be associated with the checked conversation. As a result, the checked conversation may be included in the search results produced in response to queries for messages associated with "Label 2." In some embodiments, the labels associated with each conversation in a list of conversations are displayed in the corresponding row of the form, and thus "Label 2" will be displayed in the row corresponding to the conversation associated with "Label 2" in step 506. Of course, it will be recognized by those skilled in the art that the user can input customized label names and/or the system may provide predefined labels.

Viewing a Conversation

Figure 6A:
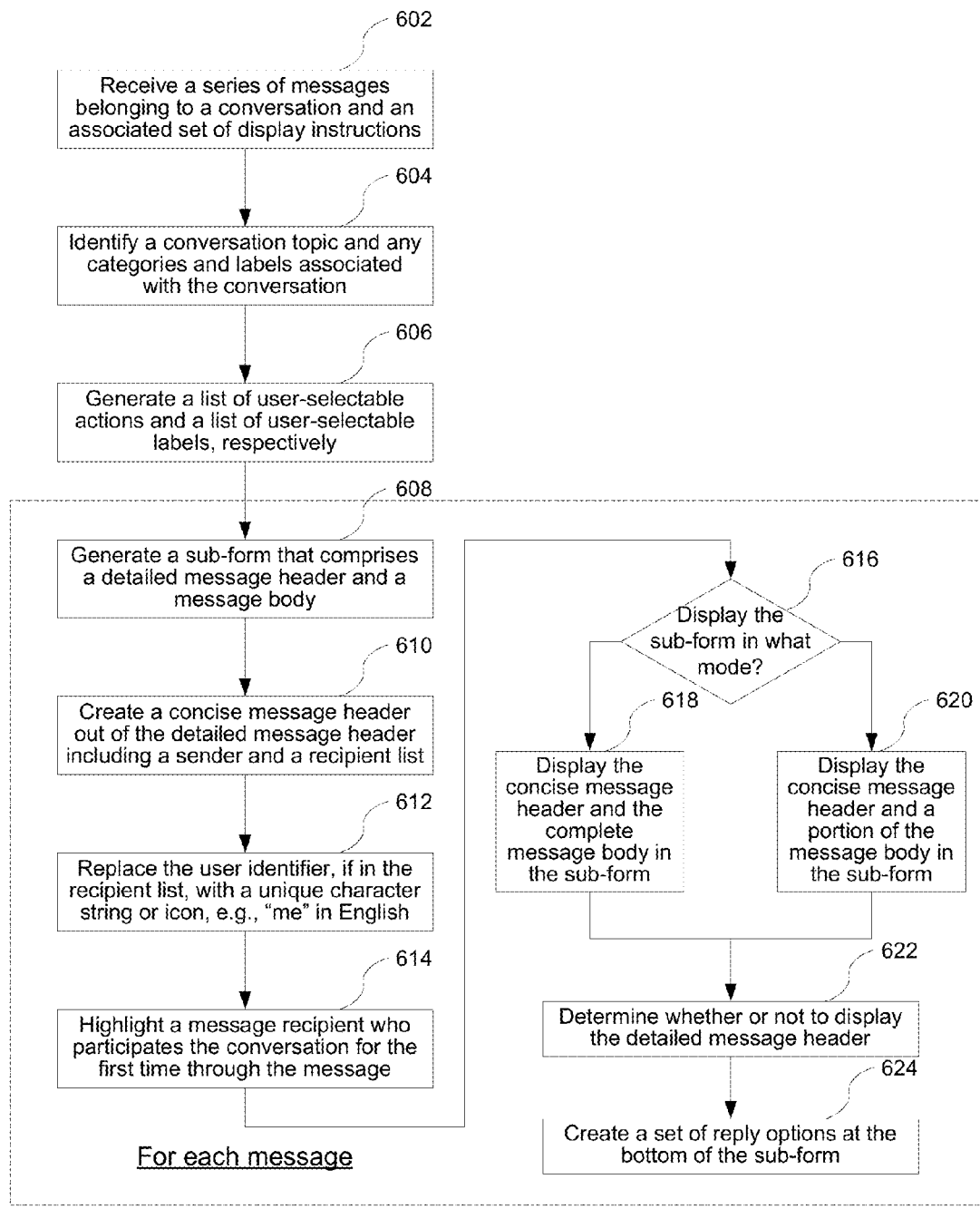
FIG. 6A is a flowchart depicting how the conversation assistant generates a conversational view in response to the conversation management system's display instructions.

FIG. 6A is a flowchart depicting how the conversation assistant generates a conversational view in response to the conversation management system's display instructions. In some embodiments, some of the actions shown in FIG. 6A, such as actions for formatting the conversation information to be displayed, are performed by the conversation management system prior to sending the conversation information to the conversation assistant in the client.

The conversation assistant first receives a series of messages belonging to a particular conversation as well as an associated set of display instructions at step 602. The conversation assistant, at step 604, identifies the topic of the conversation as well as any system-defined categories and user-defined labels associated with the conversation. Based on the categories and labels, the conversation, at step 606, generates a list of user-selectable actions and a list of user-selectable labels, respectively. These two lists are similar to the two pull-down lists 344 and 345 shown in FIG. 3B. In one embodiment, the list of user-selectable actions includes only actions that are applicable to the particular conversation (i.e., the conversation to be displayed). Therefore, a conversation that is already in the "Trash" category cannot be associated with the "Trash" category again. By the same token, the list of user-selectable labels only includes labels that have not yet been associated with the particular conversation.

Starting from step 608, the conversation assistant generates a sub-form for each individual message in the conversation, the sub-form including at least a detailed message header and a message body. Each detailed message header includes the names and/or addresses of the sender and all the primary and second recipients, a set of message-level actions and a date/time value. The conversation assistant also creates a concise message header from the detailed message header at step 610. The concise message includes the identifiers of the sender and the recipients. If the user himself is in the recipient list, the conversation assistant utilizes a unique character string or icon as his identifier at step 610, which is similar to the user's identifier in the sender list. For example, the pronoun "me" in English can be used to represent the user in the concise message header at step 612. If the message is the first one to identify a particular recipient (i.e., in the primary or secondary recipient fields of the message header) in this conversation, the conversation assistant will highlight the recipient's identifier in the concise message header at step 614.

Next, the conversation assistant decides how to display the sub-form at step 616. If the message associated with the sub-form has not been viewed or marked as read by the user, the sub-form is displayed in an expanded mode, i.e., both the concise message header and the complete message body are displayed at step 618. If the message has been viewed or marked as read, the sub-form, by default, is displayed in a compacted mode, containing only the concise message header and a portion of the message body (e.g., the first few lines of the message) at step 620. The user can subsequently expand the compacted sub-form by clicking on it. Similarly, the sub-form does not show the detailed message header, but does include an option for the user to choose if he wants to see the detailed message header at step 622. Finally, the conversation assistant at step 624 creates a set of reply options at the bottom of the sub-form, e.g., "Reply", "Reply to All" and "Forward". In some embodiments, a subset of the actions described above are performed for each message in the conversation. In some embodiments one or more addition formatting actions are performed.

Figure 6B:
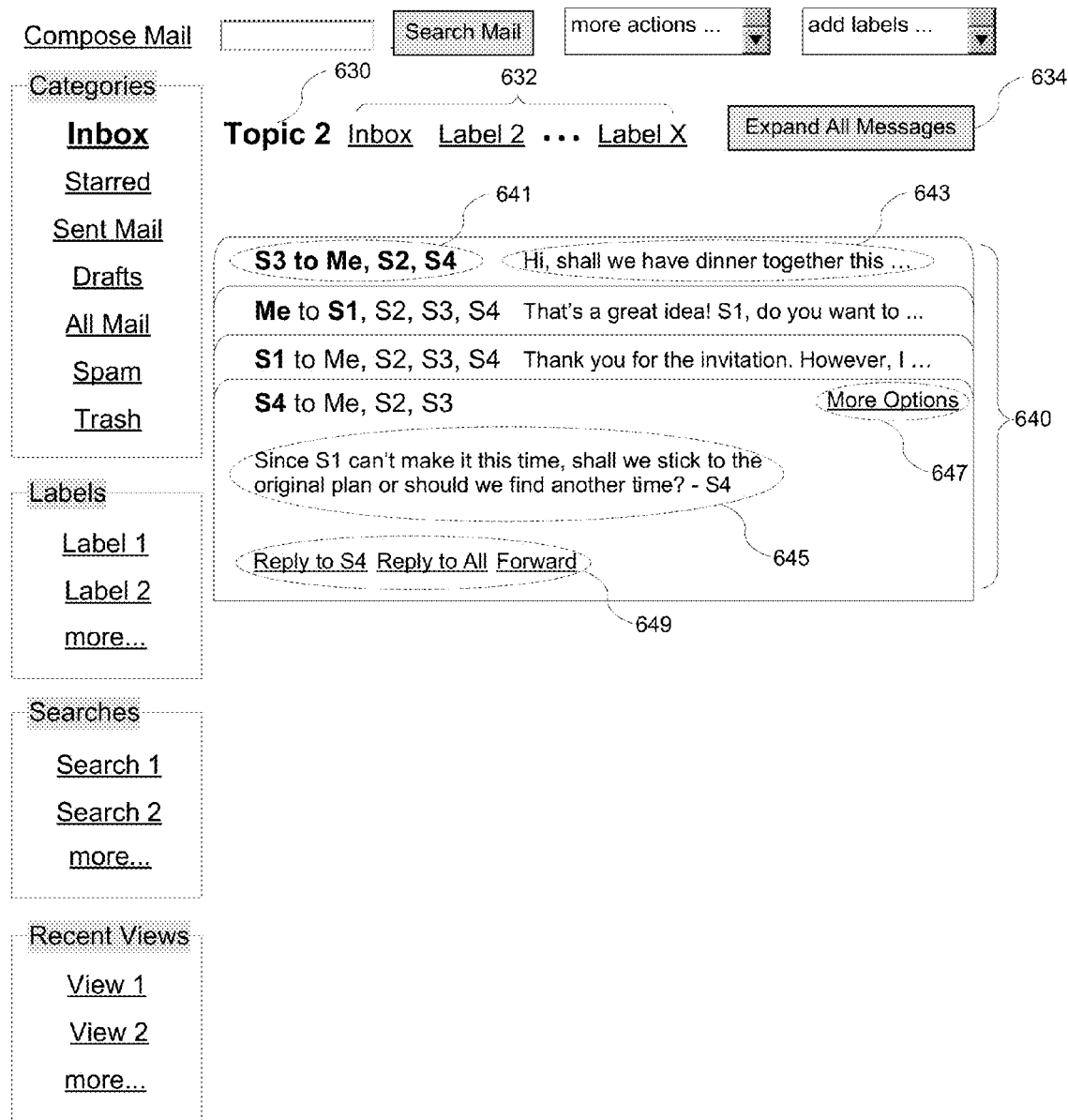
FIG. 6B is a screenshot of a conversational view in which all the messages are displayed in a compacted mode according to one embodiment of the present invention.

FIG. 6B is a schematic screenshot of the second conversation in FIG. 3B according to one embodiment of the present invention. The top and left portions of the screenshot are identical to that of FIG. 3B. But the list of conversations 360 has been replaced by a list of messages 640. On top of the list of messages are the conversation's topic "Topic 2" 630, all the user-defined labels 632 associated with the conversation and an "Expand All Messages" button 634. Since the four messages have been viewed or marked as read by the user, the top three messages in the list are displayed in the compacted mode and only the last (and the most recent) one is displayed in the expanded mode. This provides a visual effect that all the messages in the conversation are piled together. Each compacted sub-form displays a concise message header 641 and a snippet 643 such as the first few words of the message body. Note that all the recipients are highlighted in the concise message header 641 since this is the first message of the conversation. In contrast, only one identifier "S1" is highlighted in the second compacted sub-form since this is first message in which S1 is a participant in the conversation. The expanded sub-form includes a complete message body 645, a "More options" link 647, which causes the detailed message header to be display when selected, and a list of reply options 649. Since the last message was sent by S4, one of the reply options is "Reply to S4", which alerts the user that a reply will be addressed to S4.

In some embodiments, when the number of messages in a conversation exceeds a threshold value (e.g., eight or ten messages), and a plurality of consecutive messages in the conversation are to be displayed in a compacted sub-form (e.g., messages marked as read, in a conversation selected from an Inbox list of conversations), these messages are displayed in a second compacted sub-form that includes no text, and thus no sender list and no snippet. Instead, the second compacted sub-forms represent each of these messages with a small bar. The visual effect is that these sub-forms appear like the edges of cards in a deck of cards. In some embodiments, the first and last messages in a conversation are never shown in the second compacted sub-form, and more generally certain messages are excluded from being represented by the second compacted sub-form. The second compacted sub-form is used to facilitate viewing conversations having large numbers of messages. This same methodology can be used for representing the messages in a conversation matching a user-specified search query, where the conversation has more than a threshold number of messages. In this case, the messages to be represented by the second compacted sub-form are groups of consecutive messages that do not match the search query.

Figure 6C:
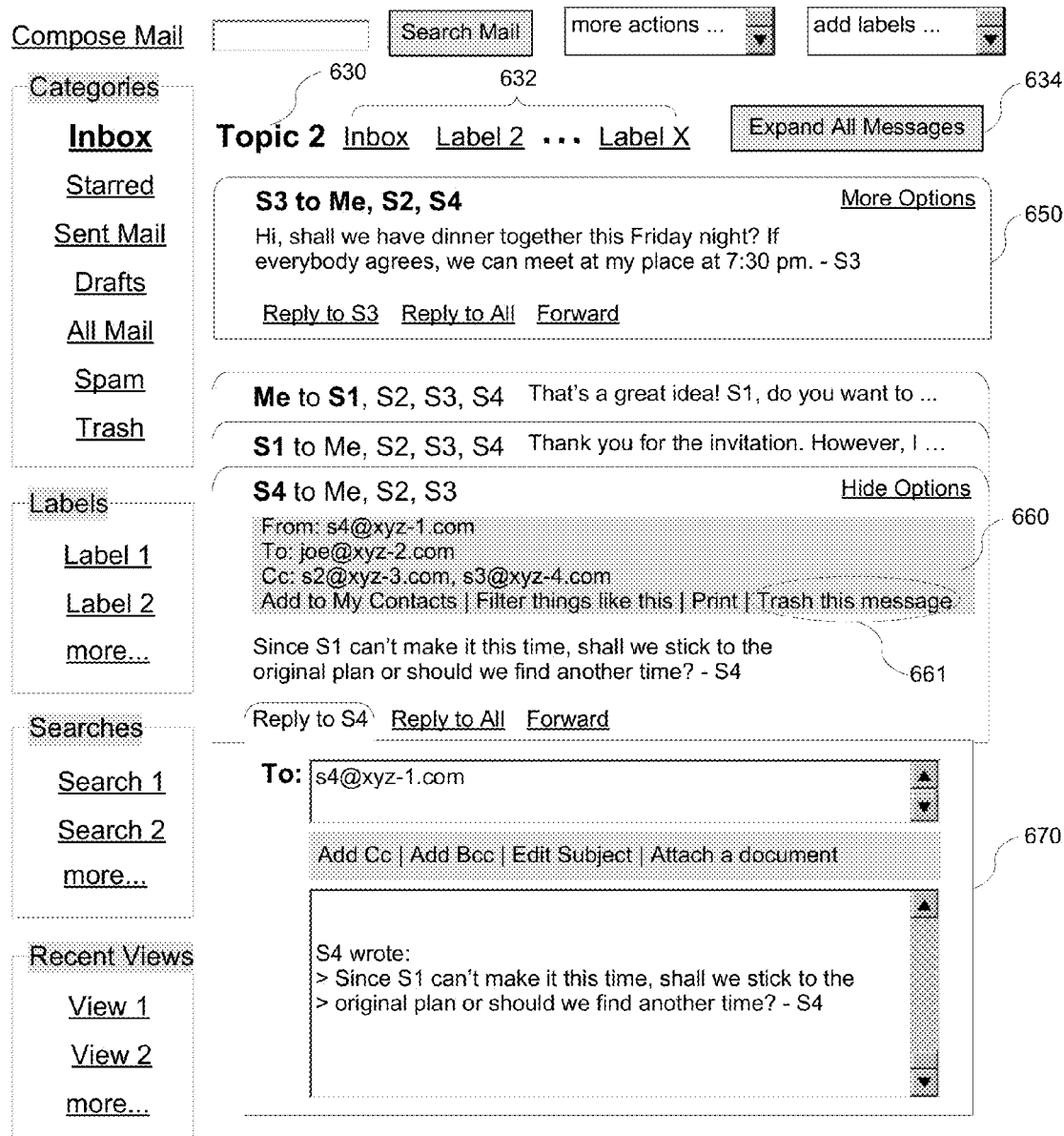
FIG. 6C is a screenshot of a conversational view in which some of the messages are displayed in the compacted mode and some are in an expanded mode according to one embodiment of the present invention.

FIG. 6C is a schematic screenshot that is similar to the one shown in FIG. 6B except that (1) the first sub-form 650 is displayed in an expanded mode after the user clicks on the sub-form, (2) the last sub-form includes the detailed message header 660, and (3) a message reply form 670 is attached to the last sub-form after the user clicks on the "Reply to S4" link. In one embodiment, a text box for replying to a message (e.g., the last message) in a conversation may be persistently displayed in association with that message when a user is viewing a conversation's contents. In other words, the message reply form 670 is displayed and the reply text box associated therewith are accessible to a user without requiring a user to click the "Reply to S4" link. In other embodiments, a message reply form may be persistently displayed for all of the messages in a conversation, or for all messages displayed in an expanded mode.

The first expanded sub-form 650 is structurally the same as the last sub-form shown in FIG. 6B. It includes a concise message header, a "More Options" link, a message body and a set of reply options at the bottom of the sub-form. The detailed message header 660, in addition to the message sender and recipients' e-mail addresses or other identifiers, includes a list of actions that the user can take. For example, the "Trash this message" action 661 allows the user to remove the message from the conversation. The message reply form 670 by default only includes S4's address in the "To:" field since the sender of the message to which the user is replying is S4. However, the message reply form provides the user with additional options (e.g., "add Cc", "add Bcc") if the user would like to send the reply message to more recipients. The message reply form 670 also allows the user to edit the subject of the original message and attach a document to the reply message.

Figure 6D:
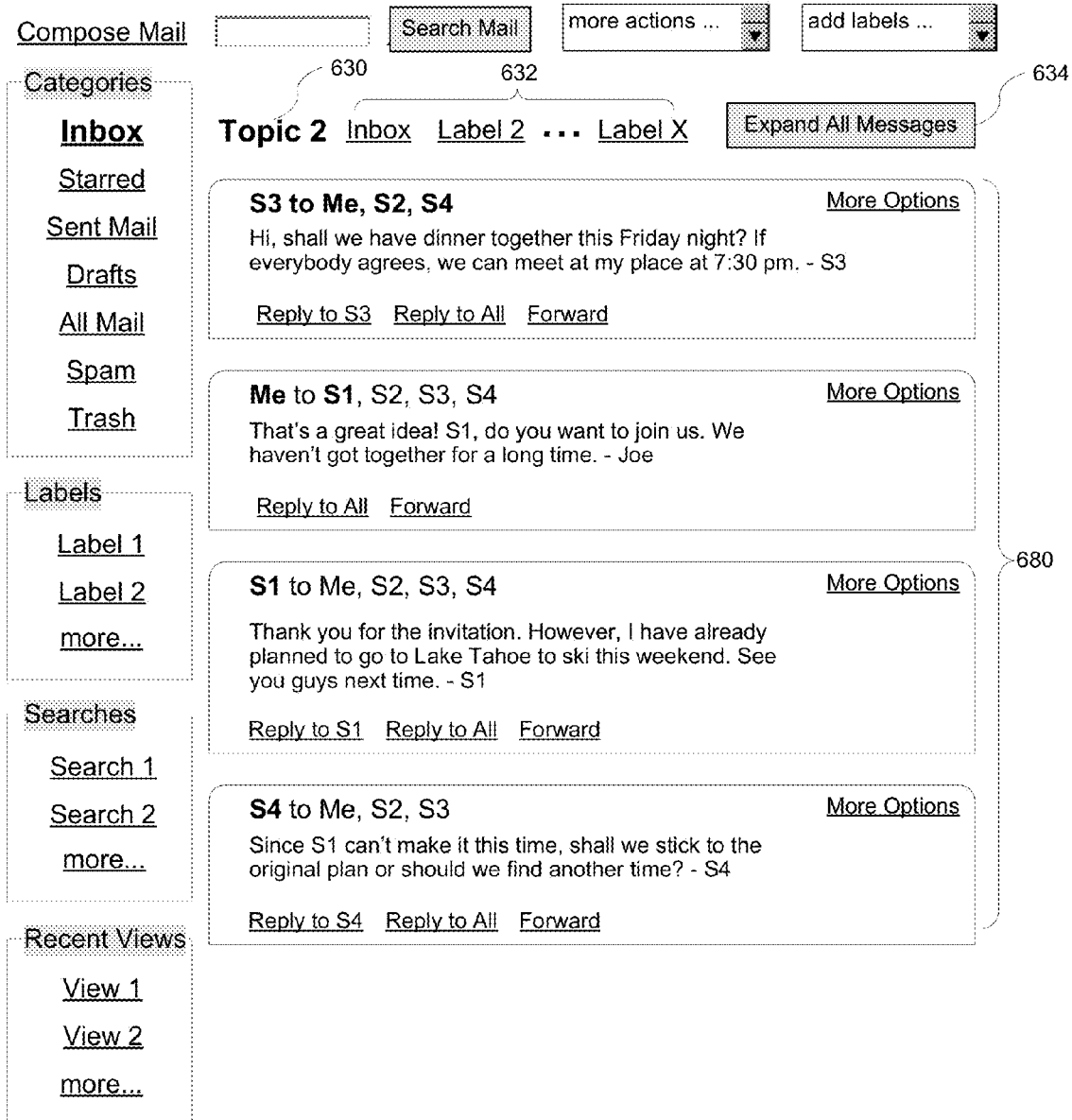
FIG. 6D is a screenshot of a conversational view in which all the messages are displayed in the expanded mode according to one embodiment of the present invention.
Figure 7A:
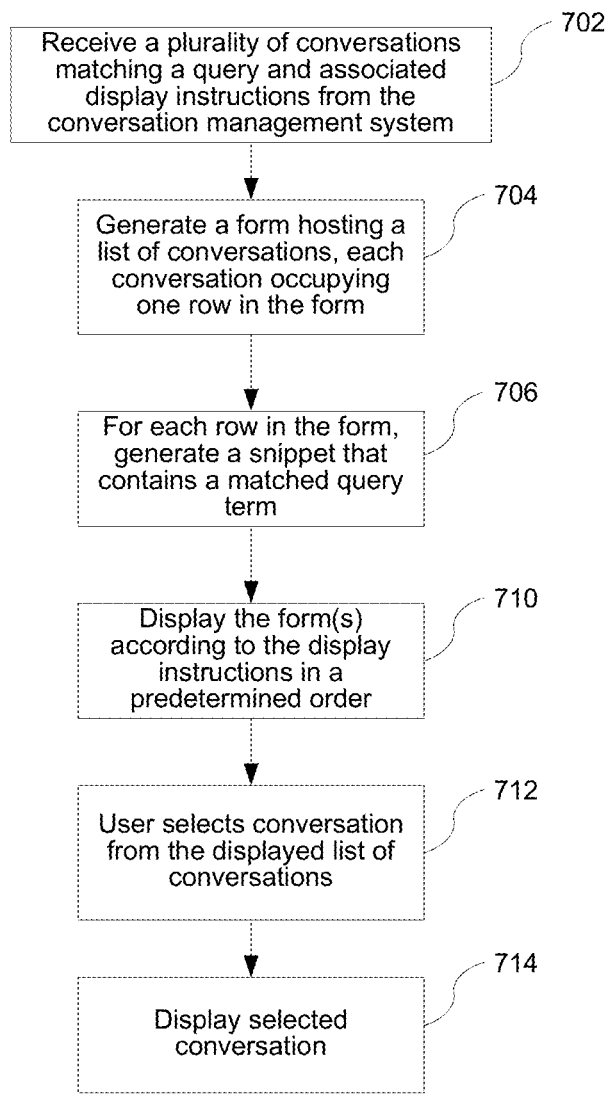
FIG. 7A is a flowchart illustrating how the conversation assistant generates the various forms for displaying the conversations that match a user's search request.
Figure 7B:
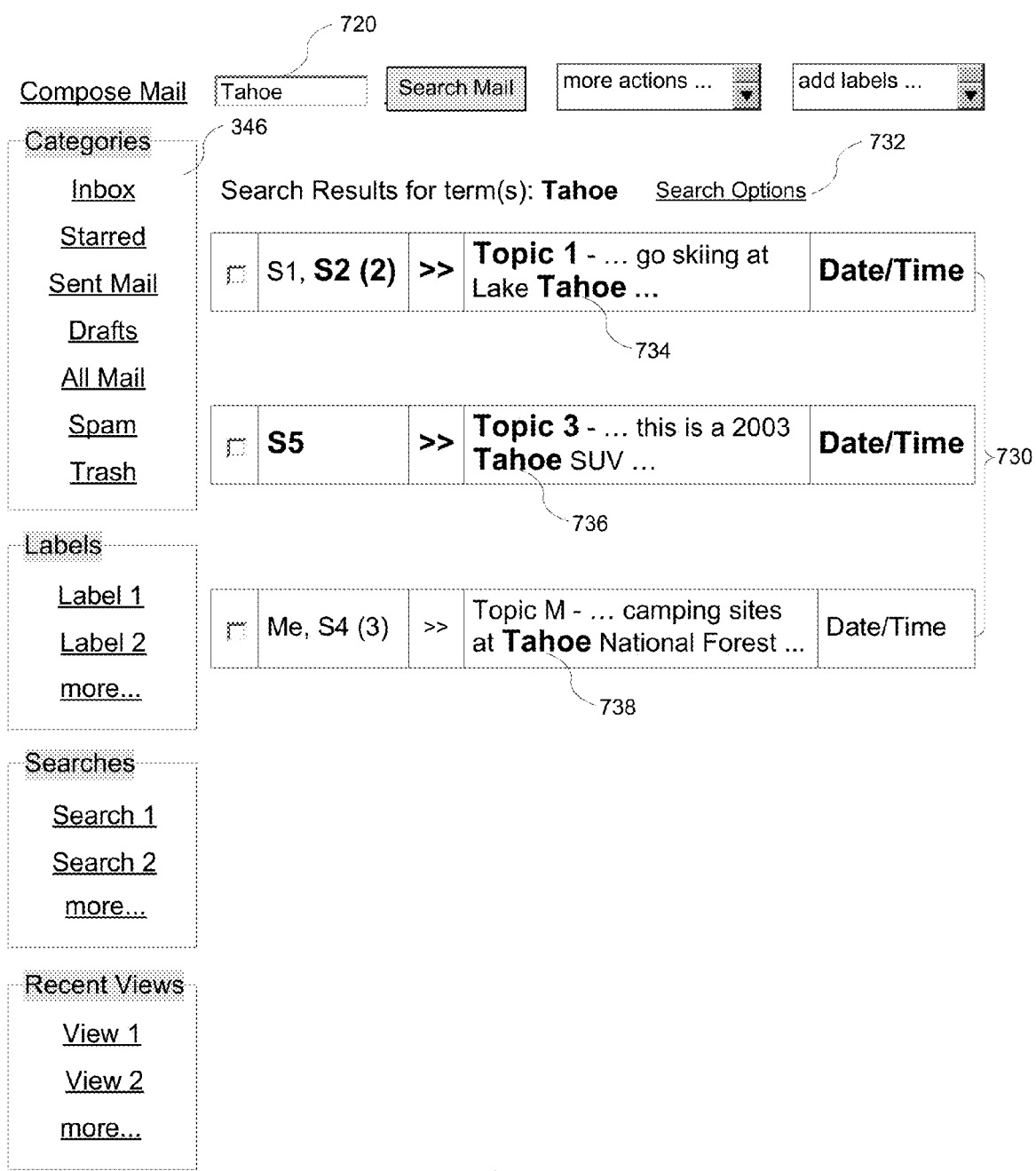
FIG. 7B is a screenshot comprising three conversations that match a query term "Tahoe" according to one embodiment of the present invention.
Figure 7C:
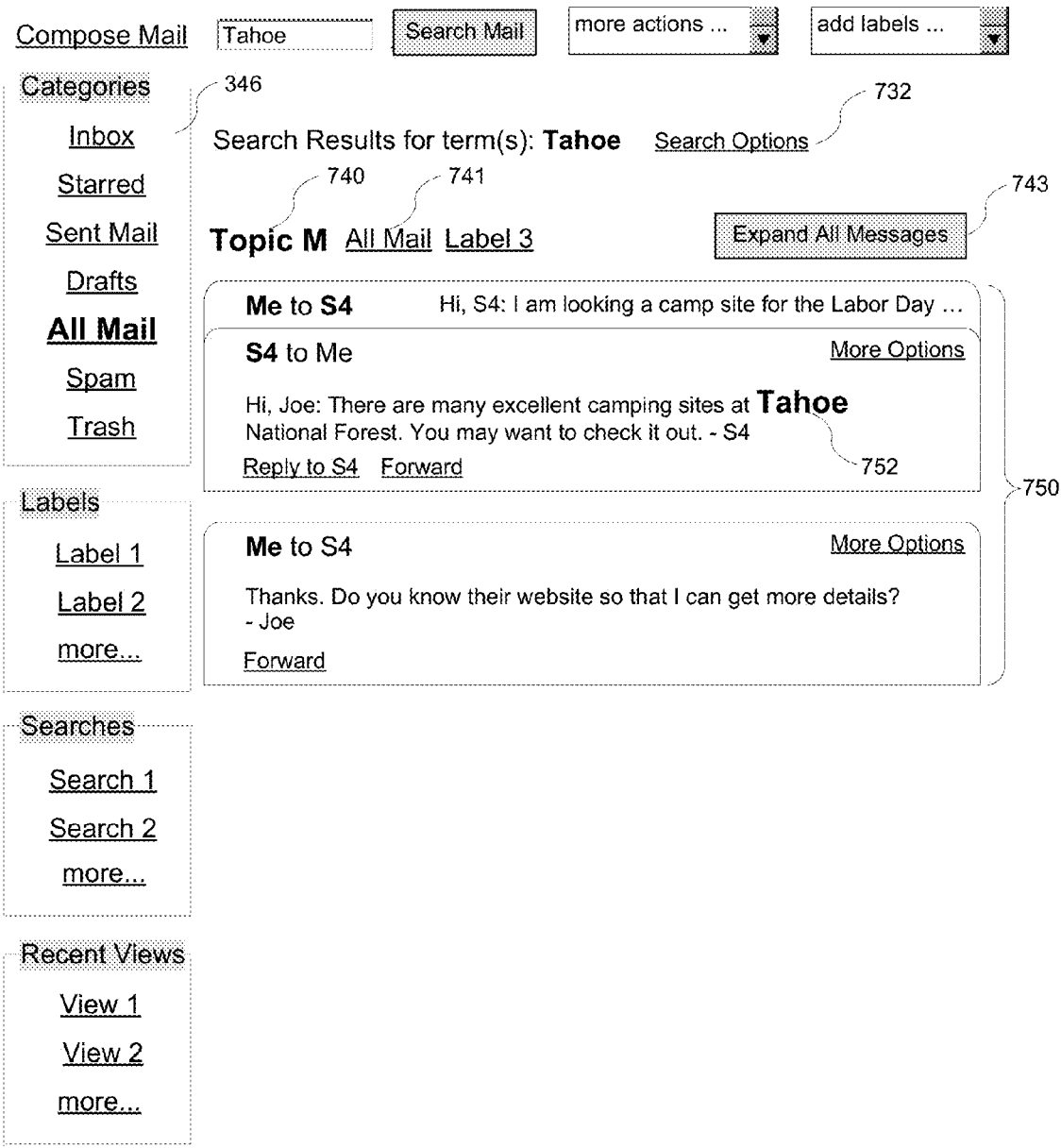
FIG. 7C is a screenshot of messages in a conversation matching or not matching a query term and displayed in different modes according to one embodiment of the present invention.

FIG. 6D is a schematic screenshot of the conversation shown in FIG. 6B after the user clicks on the "Expand All Messages" button 634 (or button 743, FIG. 7C). As a result, all four messages 680 are displayed in the expanded mode. Note that the text in the button 634 changes to "Compact All Messages". The display of the conversation returns to the format shown in FIG. 6B after the user clicks on the button 634 again.

Using Queries to Locate, List and Display Conversations

As mentioned above, a user may search for conversations that match a user specified query. The conversation management system 102 and the conversation assistant 110 work together to generate search results corresponding to the query and to present the results to the user in a highly intuitive fashion. FIG. 7A is a flowchart illustrating how the conversation assistant 110 generates the various forms for displaying the conversations that match a user's search request. In some embodiments, some of the actions shown in FIG. 7A, such as actions for formatting the conversation information to be displayed, are performed by the conversation management system prior to sending the conversation information to the conversation assistant in the client.

At step 702, the conversation assistant 110 receives information representing a plurality of conversations matching a search query (which may contain one or more query terms) and associated display instructions from the conversation management system 102. At step 704, the conversation assistant 110 generates a form that hosts a list of conversations, each conversation occupying one row in the form. For each row in the form, the conversation assistant 110 also generates a snippet that contains a matched query term at step 706. In some embodiments, the conversation assistant 110 highlights with the snippets terms that match any of the query terms in the search query. At step 710 the list of conversations is displayed. FIG. 7B is a schematic screenshot of a list of conversations produced in accordance with these steps. In some embodiments, the user may specify a user preference that causes the generation and/or display of snippets to be suppressed.

In some embodiments, if the user selects (e.g., clicks on) a row representing a conversation in the list of conversations (e.g., a row in the list of conversations shown in FIG. 7B) (step 712), the conversation assistant 110, at step 714, displays the selected conversation. To do this, the conversation assistant generates a series of sub-forms hosting a series of messages that are associated with the selected conversation. In particular, if the selected conversation is selected from a list of conversations produced in response to a user specified search query, the sub-forms whose associated messages do not contain any query term in the search query are displayed in a compacted mode while the sub-forms whose associated messages contain at least one query term are displayed in an expanded mode. The conversation assistant 110 also highlights the matched query terms in the message body. An example of the display of a selected conversation that matches a specified query is shown as a schematic screenshot in FIG. 7C. If the selected conversation is selected from a category list of conversations, such as an Inbox list of conversations, the initial display of the message is as described above with respect to FIG. 6C.

FIG. 7B is a schematic screenshot of a browser window listing three conversations 730 that match the query term "Tahoe" 720. Above the three conversations 730 is a "Search Options" link 732. The user can click on the link to update the options that were used to conduct the search. For example, the user can specify whether the search is limited to conversations in one category or to conversations in all the categories. When the listed conversations belong to two or more distinct categories, none of the categories in group box 346 are highlighted. Within each matching conversation, a snippet that includes the term "Tahoe" 734, 736, 738 is identified and displayed with the word "Tahoe" being highlighted in each of the three conversations 730. These snippets indicate that the three conversations cover three distinct topics, i.e., the first conversation is about a ski trip to Lake Tahoe, the second conversation is about a Tahoe-model SUV, while the third conversation is about camping sites at the Tahoe National Forest. Therefore, the user can use the information in the snippet to decide which particular conversation he wants to open.

FIG. 7C is a schematic screenshot displaying all messages 750 in the third conversation, labeled "Topic M" 740, after the user clicks on it. Note that an "All Mail" category 741 has been highlighted (in group box 346) in this screenshot, indicating that the third conversation "Topic M" 740 is currently located in the "All Mail" category 741. Since the second message includes a query term "Tahoe" 752, the second sub-form is displayed in the expanded mode with the word "Tahoe" 752 highlighted.

Spell Checking

Figure 8:
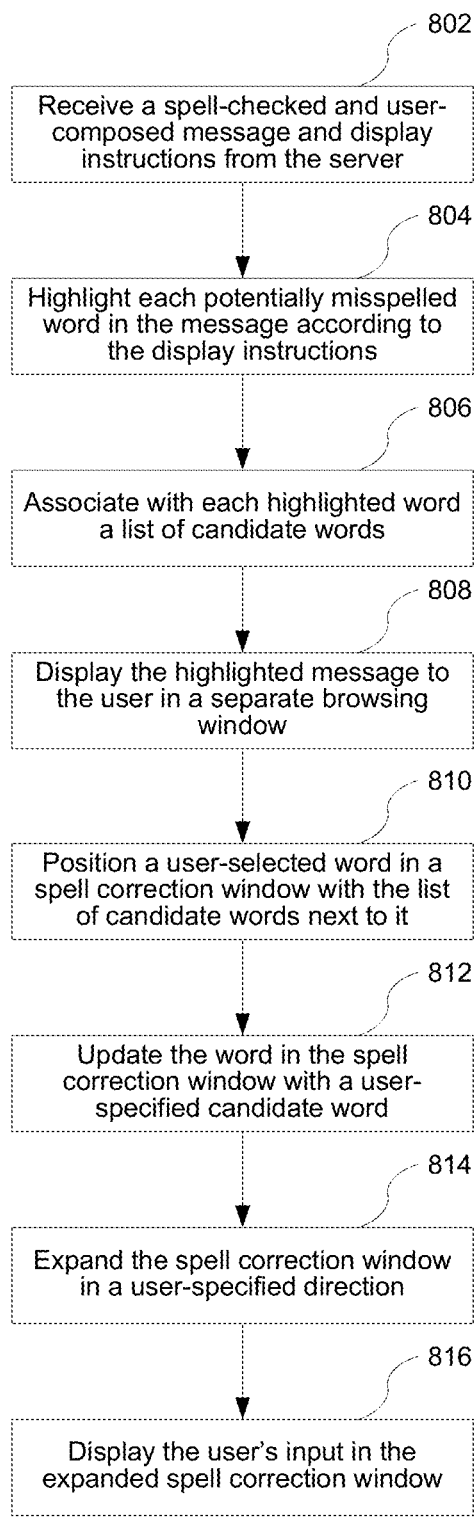
FIG. 8 is a flowchart illustrating how the conversation assistant interacts with a user to correct all the potentially misspelled words.

FIG. 8 is a flowchart illustrating how the conversation assistant interacts with a user to correct potentially misspelled words in a message being composed by a user. After composing a message and before sending it out, the user may click on the "more actions" pull-down list and select the "spell check" item. Note that this item is not shown in FIG. 4B, because the pull-down list therein only comprises conversation-level actions. "Spell check" is a message-level action that is displayed in a pull-down action list only while a message composition form is being used. In response to user selection of the "spell check" action, the conversation assistant sends the composed message to the conversation management system and then receives a spell-checked copy of the composed message as well as display instructions at step 802. Based on the display instructions, the conversation assistant highlights each potentially misspelled word in the message at step 804, associates with each highlighted word a list of candidate words generated by the system at step 806 and displays the re-formatted message in a separate browsing window at step 808. When the user selects a particular highlighted word in the browsing window, the conversation assistant positions the user-selected word in a spell correction window and attaches a list of candidate replacement terms next to the window at step 810. (It should be noted that a replacement term may contain one or more words.) The conversation assistant then updates the misspelled word in the spell correction window with the user-specified replacement term in the candidate list at step 812. The conversation assistant can also expand the spell correction window in a user-specified direction at step 814 so that the user can revise more than one word within the spell correction window at step 816.

Figure 9A:
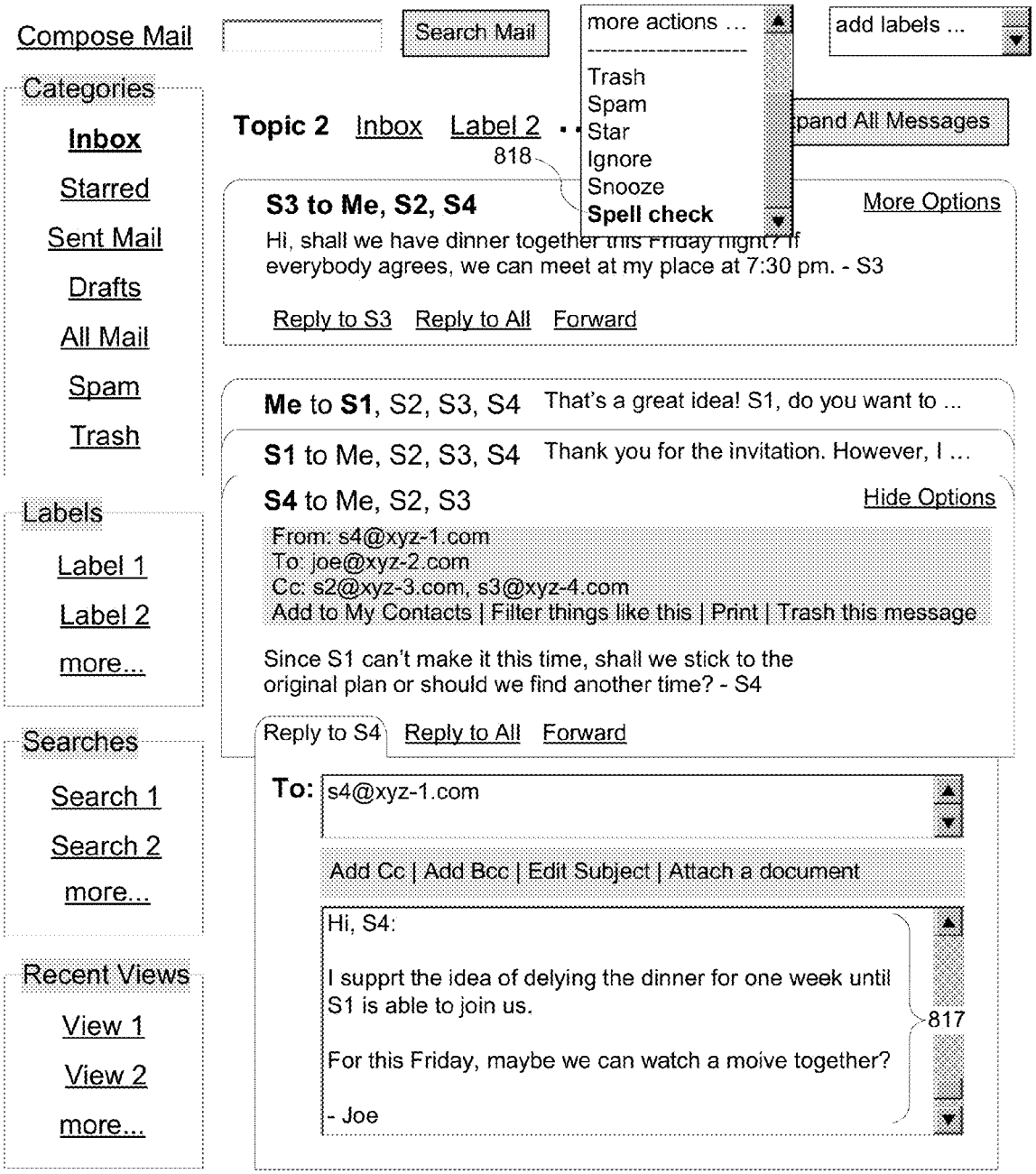
FIG. 9A is a screenshot of a conversation including a reply message composed by the user.

FIG. 9A is a screenshot illustrating the same conversation shown in FIG. 6C except that the user has composed a reply message 817 to S4. Before sending the message, the user decides to conduct a spell check. Therefore, the user clicks on the "more actions" pull-down list and then selects the "Spell Check" item 818. The conversation assistant, in response, sends the composed message to the conversation management system and then displays the spell check result in a separate browsing window.

Figure 9B:
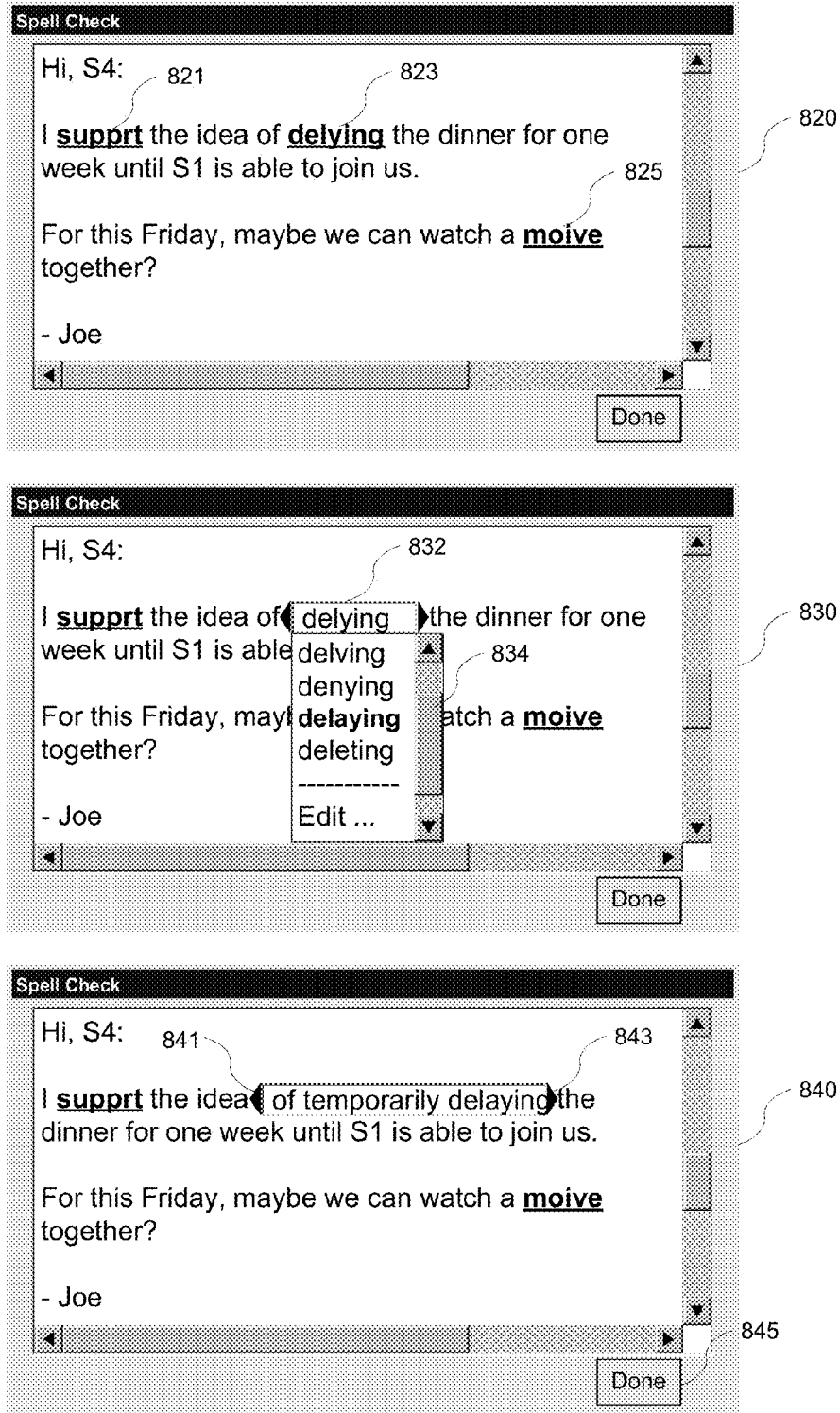
FIG. 9B depicts a screenshot comprising three separate browsing windows at different stages of the spell check process.

FIG. 9B depicts a screenshot comprising three separate browsing windows at different stages of the spell check process. The first window 820 contains a spell-checked copy of the message. In particular, three potentially misspelled words 821, 823 and 825 have been highlighted in the window. After the user clicks on the second word 823, the word "delying" is then incorporated into a spell correction window 832 as shown in the second browsing window 830. Further, a list of candidate words 834 generated by the system are displayed under or adjacent the spell correction window. The user then selects the third replacement term, "delaying", to replace the misspelled term "delying". If the user wants to add the word "temporarily" before the corrected word "delaying", the user can click on the left arrow 841 (or right arrow 843) as shown in the third window 840, position the browser window pointer to a position in front of the misspelled term "delying," and then enter the word "temporarily." Finally, after correcting all the misspelled words, the user clicks on the "Done" button 845, which causes the message to be sent to S4.

Conversation Server

Figure 10:
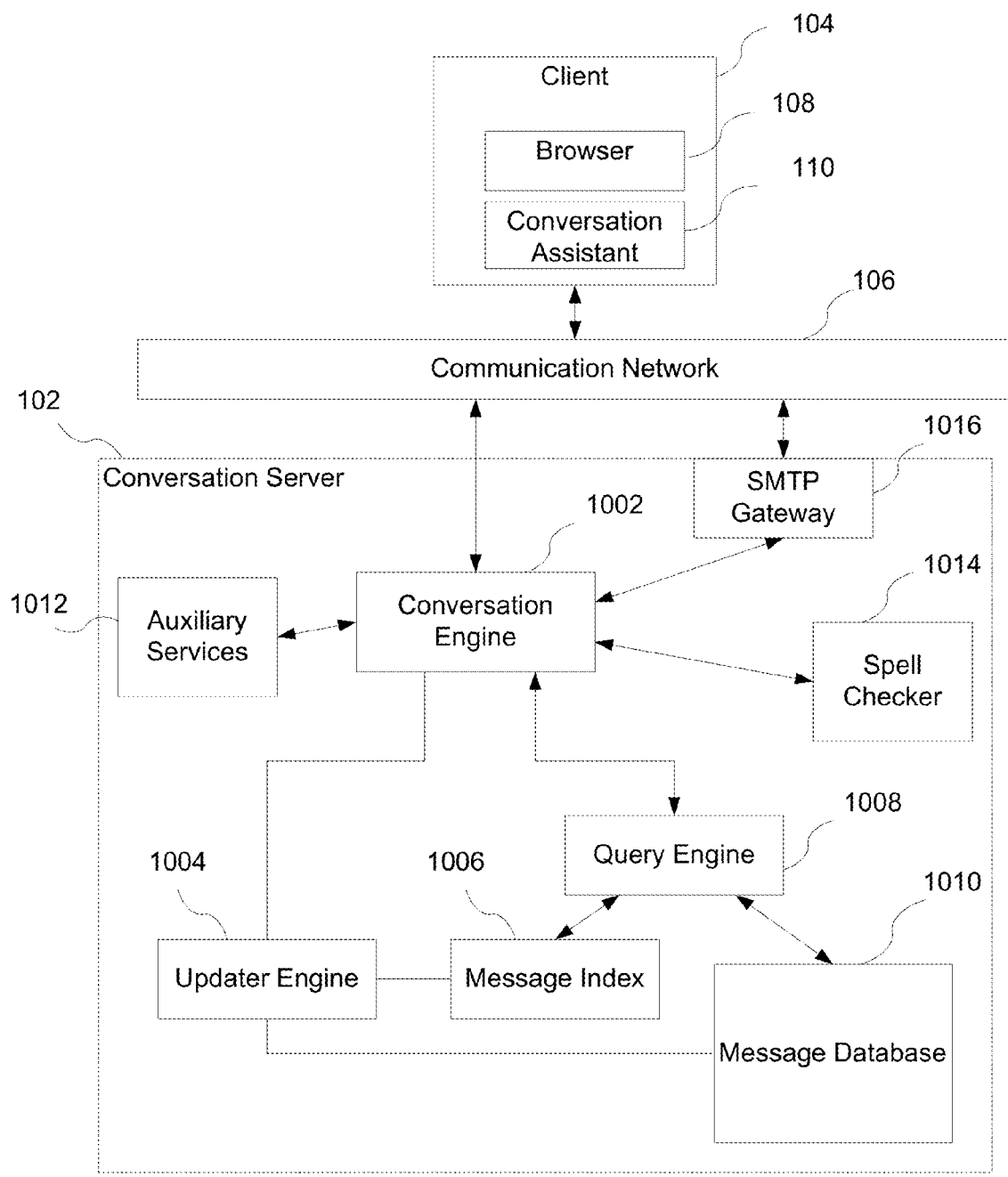
FIG. 10 depicts an embodiment of a conversation server.

The FIGS. 10 through 19 may assist in describing an embodiment of the Conversation Server 102 described earlier. One embodiment of the Conversation Sever 102 is illustrated in FIG. 10. Conversation Server 102 includes Conversation Engine 1002, Updater Engine 1004, Message Index 1006, Query Engine 1008, Message Database 1010, one or more Auxiliary Services servers 1012, Spell Checker 1014, and SMTP 1016.

The Conversation Engine 1002 handles requests from and responses to the Conversation Assistant 110, via its connection with Communication Network 106. Communication Network 106 may include the Internet, one or more local area networks (LANs), one or more wide are networks (WANs), other types networks, or a combination of such networks. The Conversation Engine is also connected to various auxiliary services such as Auxiliary Services servers 1012 and Spell Checker 1014. A Query Engine 1008 is connected to the Conversation Engine 1002, the Message Index 1006, and the Message Database 1010. An Updater Engine 1004 is connected between the Conversation Engine 1002 and Message Index 1006 as well as Message Database 1010. The SMTP Gateway 1016 is connected between the Conversation Engine 1002 and the Communication Network 106. Although FIG. 10 shows the Conversation Server 102 as a number of discrete items, the figure is intended more as a functional description of the various features which may be present in the Conversation Server 102 rather than a structural schematic of the embodiments described herein. In practice, and as recognized by those of ordinary skill in the art, items shown separately could be combined and some items could be separated. For example, some items shown separately in the figure could be implemented on single servers and single items could be implemented by one or more servers. The actual number of servers in Conversation Server 102 and how features are allocated among them will vary from one implementation to another, and may depend in part on the amount of email traffic that the system must handle during peak usage periods as well as during average usage periods.

As briefly mentioned above, the Conversation Engine 1002 may respond to a variety of requests from the Conversation Assistant 110 related to messages and return conversation-based responses via its connection with the Communication Network 106. Although, the SMTP Gateway 1016 may also be connected to the Communication Network 106, the SMTP Gateway 1016 may be more directly involved in receiving and sending messages. In some embodiments, the SMTP Gateway 1016, for example, transmits and receives messages using the Simple Mail Transfer Protocol (SMTP). The SMTP Gateway 1016 may receive a new message from the Communication Network 106 and send the message to Conversation Engine 1002 for additional processing. Additionally, the SMTP Gateway 1016 receives messages from the Conversation Server 1002 and then transmits (via the Communication Network 106) those messages to the recipient addresses specified in the messages.

The Conversation Engine 1002 may also handle requests for spell checking of a message that might be being composed. The Conversation Engine 1002 sends the portions of the text to be checked to the Spell Checker 1014 for spell checking. The Spell Checker 1014 returns information including an identification of the text identified as potentially incorrectly spelled. In some embodiments, the Spell Checker 1014 provides information regarding suggestions for the text identified as potentially incorrectly spelled. In some embodiment, this information is sent to the Conversation Assistant 110 for subsequent processing.

The one or more Auxiliary Services servers 1012 provide additional services to the Conversation Engine 1002. In some embodiments, the auxiliary services servers 1012 include a spam detection module. Operation of the spam detection module is discussed below with reference to FIG. 11. In some embodiments, the auxiliary services servers 1012 include an attachment management module, which manages the efficient storage and retrieval of files attached to email messages.

Figure 11:
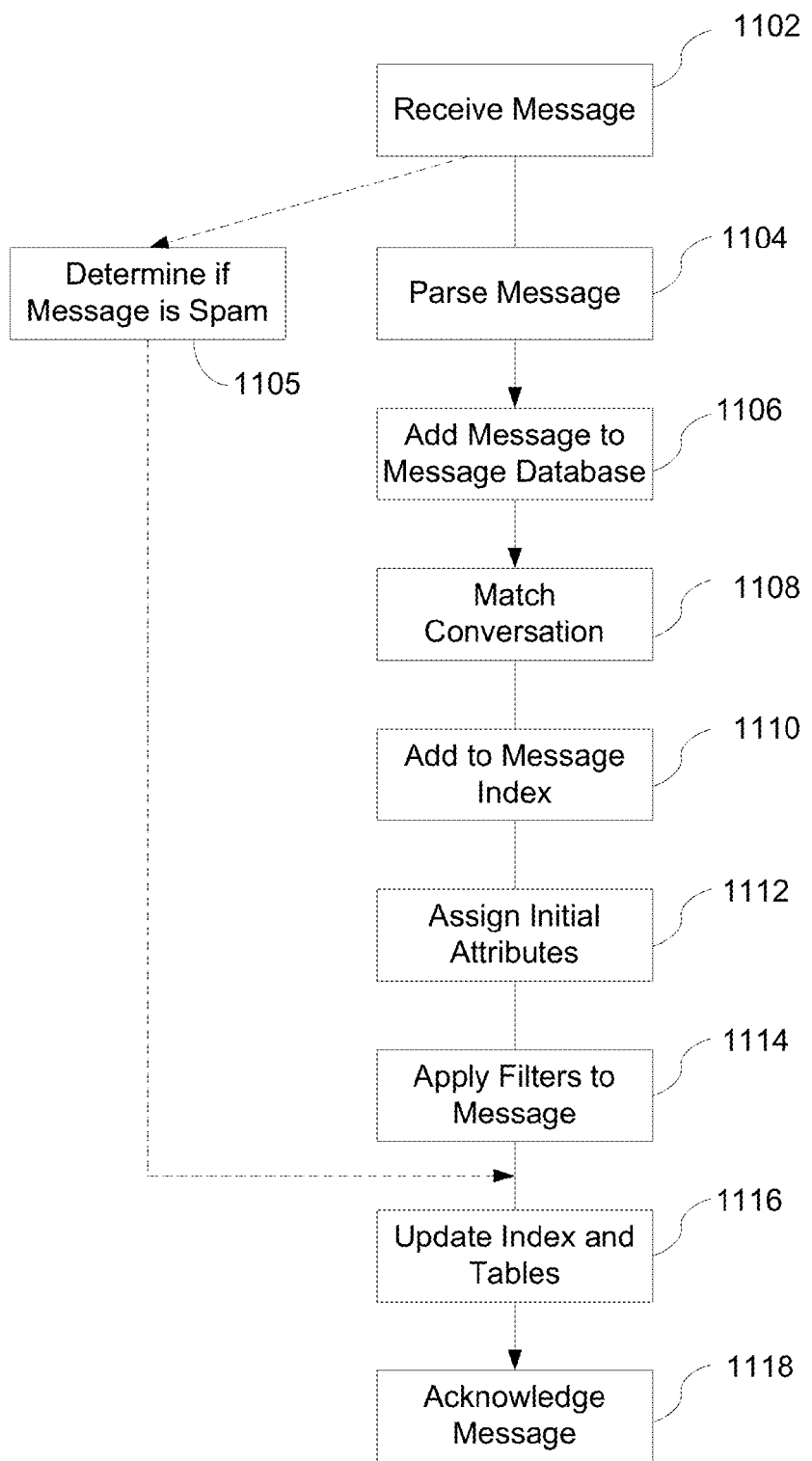
FIG. 11 is a flowchart representing a method of processing a received message.

An embodiment for processing a received message is shown in FIG. 11. A message is received, assigned to a conversation, indexed, assigned one or more attributes and stored. Initially a message may be received by the SMTP Gateway 1016, for example, where some processing and handling may occur, and may then be passed to the Conversation Engine 1002 (stage 1102). The Conversation Engine 1002 may generate a message identifier for the message. The message identifier may be used to distinguish one message from another. In an embodiment, the identifier is a N bit number composed of one or more parts. For example, in an embodiment the message identifier may be a 64 bit number consisting of a Y bit (e.g., 32 bit or 48 bit) timestamp and a 64-Y bit hash of the message contents. A hash is a mathematical function that maps values from a large domain into a smaller one. One of ordinary skill in the art will recognize that there are many different ways to create message identifiers that provide sufficient information to distinguish messages from each other.

The Conversation Engine 1002 may then parse the message into its constituent parts (stage 1104). These parts might include the address of the sender, one or recipient addresses, the subject of the message, a "References:" field as that field is described in RFC 2822 (April 2001) described earlier, an "In-Reply-To:" field also described in RFC 2822, the content of the message, or any other information which might be contained in the message. After the message is received, and either before after parsing the message, the message is passed to a spam checking module (stage 1105) to determine if the message matches spam criteria. In some embodiments, the spam checking module works asynchronously, and in parallel with other processing of the message. In some embodiments, the spam criteria are designed to determine whether a message is likely to be an unsolicited message that the user is unlikely to want to read.

The parsed message is added to a message database (stage 1106). In one embodiment, the message is added to a message database and not subsequently modified thereafter, except perhaps for deletion.

Some or all of the parts of the message that are extracted during parsing of the message may be used to assist in determining the conversation, if any, to which the received message belongs (stage 1108). For example, the subject of a message could be compared to other messages with the same subject since it is likely that messages within a conversation will have the same, or very nearly the same, subject. If a matching conversation has not been found, then the message is associated with a new conversation.

After the conversation association has been made, the message is indexed for searching (stage 1110). In one embodiment all of the text of the message is indexed along with portions of the header information. In some embodiments, "noise words" (e.g., words such as "the", "a" and "or") in the message body are not indexed, but all other text in relevant portions of the message are indexed. One of ordinary skill in the art will recognize that those portions of the message which may be searched should be indexed. As noted below, in some embodiments information concerning attributes associated with the message are added to the index at a later stage of the message processing.

Next, an initial set of attributes is assigned to the message (stage 1112). These type of attributes may include, for example, labeling a received message as "unread" (which typically means that the message has been neither viewed nor marked as read) to indicate that the message is new. Another attribute that is initially assigned to messages, other than messages sent by the user, is the "InBox" attribute. Another set of attributes that are initially assigned to each message are the user-defined attributes associated with other messages (if any) in the same conversation. The user-defined attributes associated with the other messages in the conversation are determined by searching a conversation database that is described below with reference to FIG. 18. Other attributes may be initially assigned to the message as well. The attributes associated with a message may be used to search a message database to obtain message with similar attributes. For example, a search could be executed to search for all messages which are labeled as "unread". Additionally, the attributes of a conversation may be added to the message since, in one embodiment, a message inherits the attributes of its conversation.

In some embodiments, the attributes associated with messages may include attributes associated with individual messages, but not necessarily all the messages in a conversation. For instance, a "Marked for Deletion" attribute (sometimes also called the "Trash" attribute) may be associated with an individual message in a conversation, while not being associated with other messages in the same conversation. Messages marked for deletion are still stored by the system, and are still associated with conversations, but are normally not displayed when the corresponding conversations are displayed. One or more special views are employed to enable a user to view messages having the attribute "Marked for deletion." Such views afford the user the opportunity to "undelete" a message. On the other hand, in some embodiments, when a user-defined label is associated with a conversation, that label is associated with all messages in the conversation. In some other embodiments, when a user-defined label is associated with a conversation, that label is associated with all messages in the conversation that meet predefined criteria (e.g., messages other than those marked for deletion).

Next, any user-defined filters that the user may have established are applied to the message (stage 1114). Each user-defined filter includes a set of filter conditions and a set of actions. The filter conditions define which messages match the filer and the actions include actions that specify labels that are to be added or removed from the message. The filter conditions can include criteria with respect to the sender, the recipients, text in the message subject, text in the message, and the like. In some embodiments, the actions can include "remove from inbox" (i.e., remove the InBox label from the message, if present), adding a system label (sometimes called a category) to the message, and adding a user-defined label to the message. For instance, the filter may specify that all messages having a particular term or combination of terms be labeled with the "Trash" label. Another filter may specify that if the term "Lake Tahoe" appears anywhere in the message, a "Vacation" label is to be added to the message.

It may be noted that in some embodiments, stages 1112 and 1114 concern the assignment of labels to the message being processed. At or about the time that stages 1112 and 1114 are preformed, the results from the spam checking module (stage 1105) are retrieved. If the spam checking module classifies the message as spam, a "Spam" label is assigned to the message and any conflicting labels (e.g., "InBox" or "Trash") are removed from the message.

After the set of labels assigned to a message have been established, the index and certain tables in the Conversation Engine 1002 are updated (stage 1116) to reflect the set of labels assigned to the message. The index is updated by adding information indicating the labels to which the message is assigned. As a result, an index search on each of those labels will produce a list of messages that includes the current message being processed. In addition, at least one table or database in the conversation engine is updated to indicate the set of labels assigned to the current message being processed. This is described below with reference to FIG. 18.

Finally, an acknowledgment may sent to the sender of the message (stage 1118). In some embodiments an acknowledgment may be sent and in others it may not be sent.

While FIG. 11 shows the stages in a particular order, it is not intended to limit the order of the stages unduly. In other embodiments, the stages may be differently ordered. For example, the message could be added to the message database prior to the indexing of the message, thus stage 1114 could be followed by stage 1110. One of ordinary skill in the art would recognize various ways to reorder the stages.

Associating Each Message with a Conversation

Figure 12:
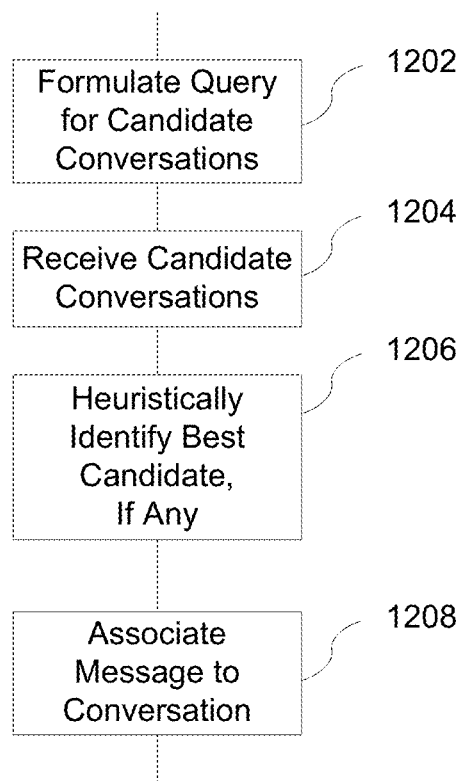
FIG. 12 is a flowchart representing a method of matching a message to a conversation.
Figure 13:
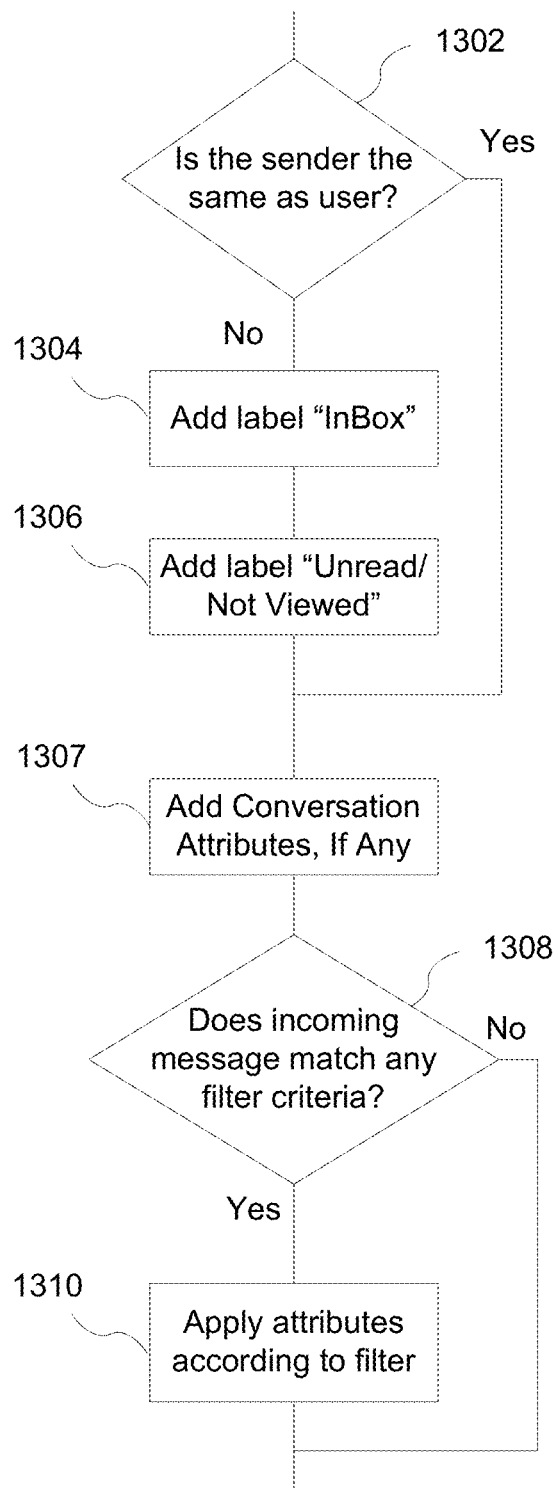
FIG. 13 is a flowchart representing a method of assigning attributes to a message.

Referring to FIG. 12, the following is a more detailed description of how a message may be matched with a conversation (stage 1208). After the message is parsed (stage 1104 of FIG. 11), portions of the constituent parts may be used to formulate a search query for candidate conversations (stage 1202). For example, conversations may be related based on temporal information, sender information, subject information, other information in the header, or system supplied information, or any combination thereof. One embodiment formulates the search query using the subject of the message along with the "References:" and/or the "In-Reply-To:" field. Other embodiments include the sender of the message or the recipients in the search query. One of ordinary skill in the art would recognize many different search queries to produce messages which might be related to the current message.

The search query is applied against previously stored messages and candidate messages are received (stage 1204). The messages, or information about the messages, is examined to determine which message (if any) best matches the current message (stage 1206). The conversation to which that message belongs is likely to be the conversation to which the current message belongs. A number of different approaches may be taken to determine to the conversation to which the current message belongs. One approach may use the subject of the current message. It is likely that messages having the same subject belong to the same conversation. Therefore, a query could be formulated that uses the subject of the current message. For example, if an incoming message has the subject "Where should we go for lunch today?", it is likely that the conversation (if any) to which this current message belongs will include one or more messages having the same subject. When comparing subjects, it may be desirable to normalize the subject prior to performing the comparison. In some embodiments, normalizing the subject includes removing prefixes such as "Re:" and "Fwd:", which are commonly added to the subject by some systems.

It may be desirable, however, to examine more than just the subject. If two messages have the same subject but one was received long before the other, then it is more likely they were not part of the same conversation. For example, if two messages having the subject "Where should we go for lunch today?" were received a month apart, it is unlikely that they were part of the same conversation. Thus, in one embodiment of the invention, if the normalized subjects of the current message and a message from the candidate conversations match, then an examination of a date/time value of the messages may be desirable.

Other factors may be considered when matching a message to a conversation such as the recipients, portions of the message content, domain addresses of the sender, or other factors. Those of ordinary skill in the art will recognize that there are many different ways to determine the conversation to which a new message belongs. Once the current message is matched up with a satisfactorily matching message, the conversation associated with the matching message may be associated with the current message (stage 1208). On the other hand, if no satisfactory matching message (and, therefore, no conversation) is found, a new conversation identifier is associated with the message (stage 1208).

As mentioned earlier, after the current message is associated with a conversation (previously existing or newly created) (stage 1208), initial attributes are added (stage 1112). One embodiment for adding these initial attributes (stage 1112) may be better understood by referring to FIG. 13. Initially, the sender of the message may be examined. If the sender of the current message is not the user for whom this message processing is being performed, it highly likely that the current message has been sent to that user by someone else. Accordingly, if at stage 1302 it is determined that the sender of the current message is not the user, an initial attribute of "InBox" (also called the InBox label) may be associated with the current message (stage 1304). An attribute of "InBox" may be used to identify those messages which have been sent to the user. For example, in some embodiments a search of messages having the "InBox" attribute is used in the production of an InBox view for the user.

In this document, the terms "attribute" and "label" are used interchangeably. Also, "associating" a particular attribute with a message, and "marking" the message with the particular attribute or label, are considered to be the same or equivalent operations.

Since it is highly likely that the current message is new, it is also highly likely that the user has not viewed this message before. Accordingly, an "Unread" attribute indicating such may be associated with the current message (stage 1306). Those or ordinary skill in the art will recognize that message attributes may be implemented in a number of way to achieve the same result. For example, a predefined value could represent "InBox." It is sufficient that messages with desired attributes be searchable based on those attributes. Other attributes can be associated with messages as well. Attributes may be thought of in a plurality of forms, though the distinction is less important than the ability to search for a particular attribute. Attributes can include system defined attributes, for example, such as InBox, Trash, Spam, All_Documents and Unread. In some embodiments, certain system attributes may be mutually exclusive (e.g., InBox, Trash and Spam). Attributes can also include user defined attributes, sometimes herein called Categories.

If the user was the sender of the message being processed (as determined at stage 1302), or after any applicable system attributes have been added to the message, such as "Unread" (stage 1306), additional attributes that belong to the conversation are added to the message (stage 1307).

Certain filter criteria may be examined and applied against the incoming message (stage 1308). In an embodiment, a user may set up filters that apply attributes to a received message when predetermined conditions are met. In another embodiment, the system may apply one or more predefined filters to received messages.

If the current message matches filter criteria, then attributes may then be applied to the message according to the filter (stage 1310). In one embodiment, the system provides tools to enable a user to set up a filter such that certain messages are not placed in the "InBox". In other words, the filter would cause the "InBox" attribute to be removed from the message. In another embodiment, the current message could be associated with a particular user-defined attribute, such as a label indicating an area of interest to the user to which one or more conversation may be associated. For example, an incoming message may be associated with a conversation having a label "food", and then a "food" label would be associated with the current message. Generally, a message inherits the labels of the conversation to which it is associated. Since a plurality of filters may be applied to received messages, newly received messages as well as their associated conversations may be associated with more than one user-defined label.

In another embodiment, the user can associate a snooze condition with a conversation. In some embodiments, the snooze condition is associated with the conversation when a user specifically commands the system to do so. In some embodiments, a snooze condition is associated with a conversation when a filter matches a message in the conversation. A snooze condition specifies certain actions to be performed whenever a new message is received in the conversation to which the snooze condition has been applied. For example, the snooze condition may prevent the system from associating the InBox label with new messages in the conversation. More specifically, a user may associate a snooze condition with a conversation (either directly, or through the operation of a filter) that prevents new messages in the conversation from being placed in the user's inbox unless certain conditions are satisfied. One such condition might be an incoming message addressed directly to the user. In this instance, when a message satisfying the snooze condition is received, the snooze condition is removed from the conversation and the incoming message is marked with the "InBox" label. In some embodiments, additional actions are also taken, such as adding the "InBox" label to other messages in the conversation. In another embodiment, all of the messages in the conversation having an "Unread" label, are labeled with the "Inbox" label. Accordingly a search of the "InBox" would return this conversation. In some embodiments, a snooze condition is associated with a conversation by generating a snooze filter that prevents new messages associated with a conversation from being marked with the "InBox" label until a predefined event or condition occurs, after which the snooze filter is deleted or revised.

Another type of filter that may be applied to received messages is a "spam" filter that identifies undesirable messages and marks them with a "Spam" label (i.e., associates the "Spam" attribute with such messages).

Figure 14:
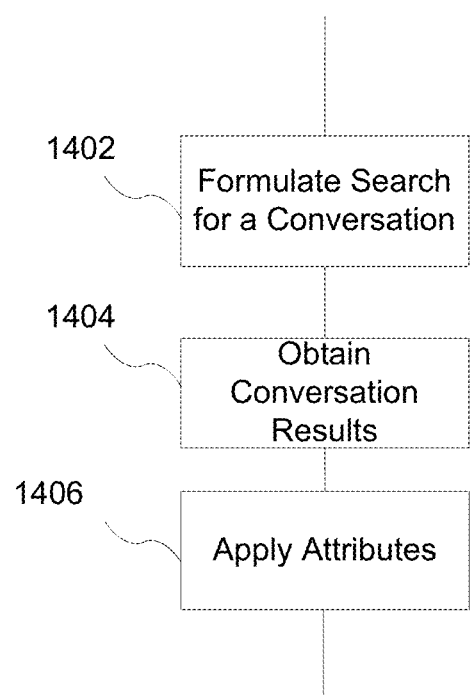
FIG. 14 is a flowchart representing a method of assigning attributes to a conversation.
Figure 15:
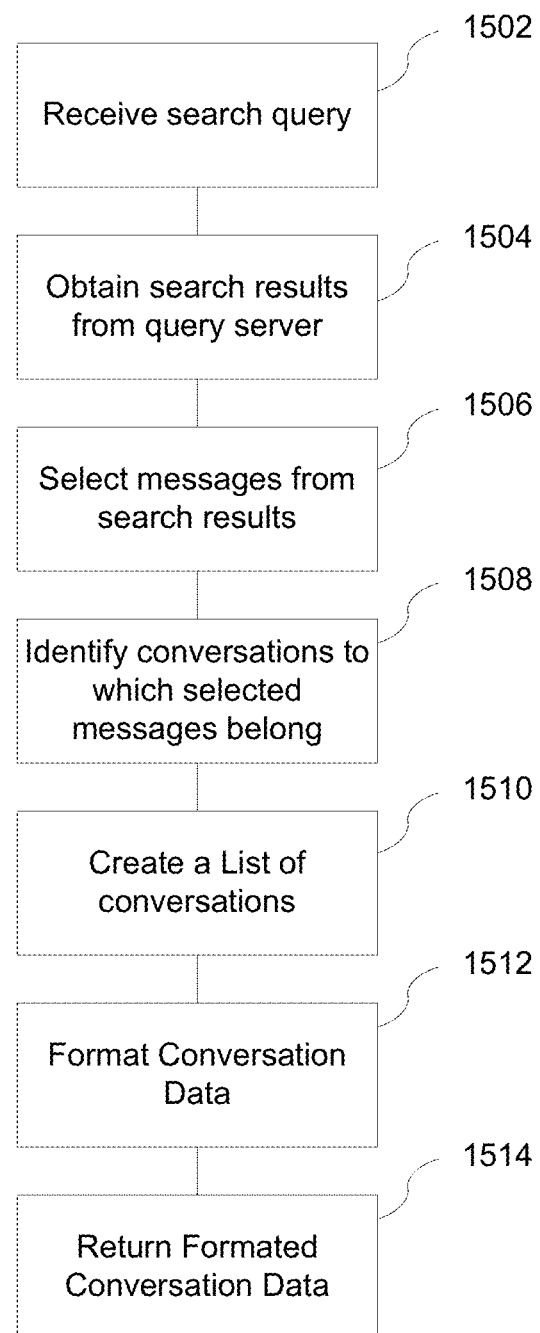
FIG. 15 is a flowchart representing a method of searching for conversations and generating a representation of an identified conversation.

FIG. 14 illustrates one embodiment for modifying the attributes of a conversation. The attributes of a conversation may be modified when the conversation, or an incoming message associated with the conversation, matches filter criteria. The attributes of a conversation may also be modified when the user indicates that the conversation should have a particular user-defined attribute. For example, the user may designate that a particular conversation should be associated with a "food" category. In such a case, the conversation (and its respective messages) are marked with a "food" label as to be associated with the "food" attribute. The user may also designate a conversation as marked for deletion.

In some ways, user-defined attributes can be conceptually compared to folders. However, embodiments of the present invention allow conversations to be associated with multiple user-defined attributes. In some embodiments, when a new attribute is associated with a conversation, all messages in the conversation are marked with the new attribute.

Referring to FIG. 14, when a given attribute of a conversation is to be modified, a search is formulated (stage 1402) to locate the conversation (stage 1404). After the conversation is found (stage 1404), the attribute of the conversation may be modified (stage 1406). The specific mechanisms used to accomplish stages 1402, 1404 and 1406 depend on the mechanisms used to associate attributes with conversations. In some embodiments, attributes are associated on a conversation by conversation basis. For example, the conversation engine may maintain a list of attributes associated with each particular conversation. Alternately, or in addition, the conversation engine may maintain an index that maps each defined attribute to all conversations marked with that attribute. Alternatively, in some embodiments the attributes associated with a conversation are associated with the individual messages in the conversation. In such embodiments, the conversation engine may maintain an index that maps each defined attribute to all messages marked with that attribute, and may further maintain a table or other mechanism for mapping each message to the conversations associated with the message.

Many features of the present invention use conversations as the basic unit of information, as opposed to messages. For instance, the InBox presents the user with a list of conversations. Some features of the present invention use searches to identify conversations to be listed in a plurality of distinct views of the conversations in a user's email account. Searching for conversations and generating a representation of an identified conversation is described next with reference to FIG. 15. Initially a search query is received (stage 1502). The search query may be user specified, or system generated (e.g., in response to the user clicking on an "inbox" icon). A search query may be based on a number of factors. The search terms in the search query may come from the user in the form of words or combination of words. For example, a user could search for messages containing the words "bagel" and "inexpensive" and the associated conversations, if any, would be returned. A search query can be generated by the system in response to certain user actions. For example, a system generated search query may search for conversations having the attribute "InBox" if the user desired an InBox view.

Any combination of searchable terms can be used in a search query. As mentioned above, searchable terms could include the text of the messages, any attributes associated with the messages, conversations, or header information associated with a message. In one embodiment, applying the search query to a database of messages returns a set of messages (stage 1504). Referring briefly to FIG. 10, this may be done, for example by sending the search query to the Query Engine 1008. The Query Engine 1008 may apply the search query to the message index 1006 which may return a list of messages. The list of messages may be received at stage 1504. If desired, other embodiments might return the list of messages in a number of different ways, including the return of a set of message identifiers, document identifiers, all or portions of messages, or any combinations thereof.

Conversations are associated with the set of messages returned at stage 1504. A number of methods may be used to identify the associated conversations. As a message is selected (stage 1506) from the set returned at stage 1504, the conversation to which the message belongs is identified (stage 1508). In one embodiment, a data structure which matches each message to a conversation may be maintained. If so, an examination of the data structure entry associated with a particular message identifier would identify the conversation to which the message belong. It may be that the number of conversations to return as result set is limited to a predefined number. If so, then processing of the set messages continues until a sufficient number of conversations are identified and the results returned. On the other hand, all of the conversations associated with the set of messages returned may be identified, but only a subset returned.

Once the list of conversations has been created (stage 1510) by identifying the conversations to which all or a portion of the returned results belong, the conversation information is formatted (stage 1512) for return to the requestor (stage 1514). The formatting stage 1512 may format a number of different types of information associated with the identified conversations, the details of which will vary from one embodiment to another. In some embodiments, the formatting information is of the type that is recognized by the Conversation Assistant 110 for presentation of the conversation information to the user.

In some embodiments, conversations in the list of conversations generated at stage 1510 are ordered according to a date/time value assigned to each conversation in accordance with a predefined rule or set of rules. As explained above, in some embodiments, each conversation in a list of conversations, is assigned a date/time equal to the date/time of the most recent message that matches the search criteria used to generate the list of conversations, and the conversations in a list of conversations are ordered (e.g., in reverse chronological order) in accordance with these assigned date/time values. One of ordinary skill in the art will recognize that there are various other ways to order and present the conversations in a list of conversations.

In some embodiments, the formatted conversation data representing a list of conversations (generated at stage 1512) includes a count of the number of messages included in each conversation in the list of conversations. In some embodiments, the message count for each conversation is displayed by the Conversation Assistant 110 to indicate to the user how many message are included in the conversation.

In one embodiment, a concise conversation header is created for each conversation in the list of conversations (e.g., during stage 1512). The conversation header may identify a list of the senders of messages in the conversation. This list may contain all or a subset of the senders within the conversation. In some embodiments, the list of senders is formatted so as to visually distinguish those senders who have sent a message (in the conversation) that is currently labeled as "Unread" by the user. In another embodiment, the Conversation Assistant 110 presents these senders in a different format from the other senders. For example, senders of the "Unread" messages may be identified using bolded or highlighted text.

In another embodiment, the list of senders of messages (in the concise conversation header) may be processed by replacing the name or address of the user with a self-referencing identifier. As a result, when the list of senders for a conversation is displayed, instead of displaying the user's name or other identifying information similar to senders who are not the user, the self-referencing identifier (e.g., "me") is displayed. Other types of self-referencing identifiers could be used to distinguish the viewing user from the other users.

In another embodiment, the concise conversation header for each message in the list of conversations may include information that indicates how the user received the message. In other words, the information may specifically identify how the user was sent the message. For example, the user might be sent the message directly, the user might be copied on the message, the user might be copied blindly on the message, or the user might be part of a distribution list to which the message was sent. One or more of these various ways the user received the message might be indicated to the user. For example, if the user was sent a message directly, an iconic representation could be used (such as ">") to so indicate when presenting the conversation to the user.

In some embodiments, the concise information header for each message in the list of conversations includes a snippet of the conversation content, the snippet including information for displaying text matching the search terms in bold and also including text surrounding the matching text formatted in a normal font. When the list of conversations is generated for the inbox or other system category, the snippet includes text from the conversation selected in accordance with predefined criteria. In some embodiments, the snippet contains text from the beginning of a most recent message in the conversation, while in another embodiment the snippet contains text automatically selected to be indicative of the conversation content.

In another embodiment, when the user selects for viewing a particular conversation from among the conversations matching a search query, the conversation engine may generate conversation information indicating which messages in the conversation match the query and which do not. The conversation information may further include a portion of text of the messages which match the search query. This conversation information may be formatted for display to the user. The conversation information may include matching messages formatted for display in an expanded mode and non-matching messages formatted for display in a compacted mode. Various types of information may be presented to the user in the expanded mode, including any combination of all or portions of the following: header information, content information, text matching the search query, and text surrounding the search query. In some embodiments, when one or more messages matching the search query are displayed in the compacted mode (e.g., in response to the user selecting a "compact all messages" button or option), the information displayed for such messages in the compacted mode includes a snippet of the message content, the snippet including information for displaying text matching the search terms in bold and also including text surrounding the matching text formatted in a normal font.

In yet another embodiment, the conversation information may indicate when certain users have been added or removed from a conversation. For example, if a user had been included on messages in a conversation up to a point in time and then no longer included, the information for one or more subsequent messages might indicate that that user was no longer part of the conversation. The Conversation Assistant might do this, for example, by using a font to display the user's name which is different from the font used to display the names of those users who are still participating in the conversation. The Conversation Assistant might use a "ghost" font for this purpose.

The conversation information may also provide information about the introduction of a new participant to the conversation. For instance, the information concerning the first message that includes the new participant may including formatting information for distinctively displaying the new participant's name. This information may be displayed to the user by the Conversation Assistant such that the newly added sender's name or other identifying information appears in bold or some other visually distinctive presentation format.

The conversation information may also include information about spell checking. The information might include an indication as to which words the Spell Checker 1014 identified as potentially incorrectly spelled, as well as information relating to suggestions for the correct spelling.

Figure 16:
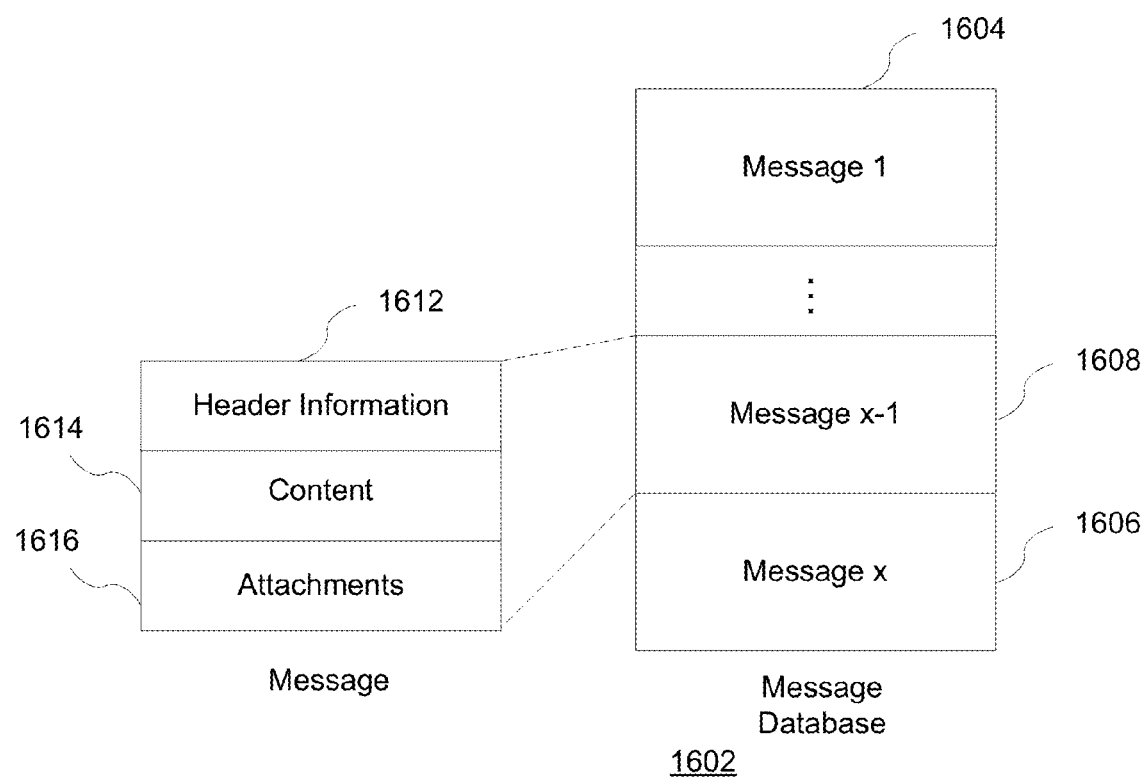
FIG. 16 depicts a message database.

FIG. 16 provides an illustration of a format for storing messages according to one embodiment of the invention. When the message is stored in a message database (stage 1114 of FIG. 11), it may be stored as illustrated in FIG. 16. A Message Database 1602 may store information about the messages, for example Message 1 (1604) through Message x (1606), where x represents the number of messages corresponding to a particular user. In one embodiment, each user's messages are stored in a Message Database 1602 unique to that user. In another embodiment, messages belonging to more than one user may be stored in the same Message Database 1602. One of ordinary skill in the art would recognize many ways to prevent messages from one user showing up as messages belong to another. In still another embodiment, messages from more than one user may be stored in a Message Database 1602, with only one storage entry per message such that multiple users would reference a single copy of a message.

In one embodiment, a Message (e.g., Message 1608) may include Header Information 1612, Content 1614, and Attachments 1616. Header Information 1614 may include the header information of the message including, for example, information identifying the sender and recipients, a time/date value of the message, and the subject. Other information might also be included in the Header Information such as that described in RFC 2822. The Content 1614 may contain the content of the message. The Content 1614 may include text and/or other types of content (e.g., images or pictures). Attachment 1616 may be the contents of any information attached to a particular message. For example, a document attached to a message might be located in this part of Message 1610. Those of ordinary skill in the art would recognize other ways to store the message information. For example, an attachment might be stored in another storage structure and a reference to it located in Attachments 1616.

User, Message and Conversation Data Structures

Figure 17:
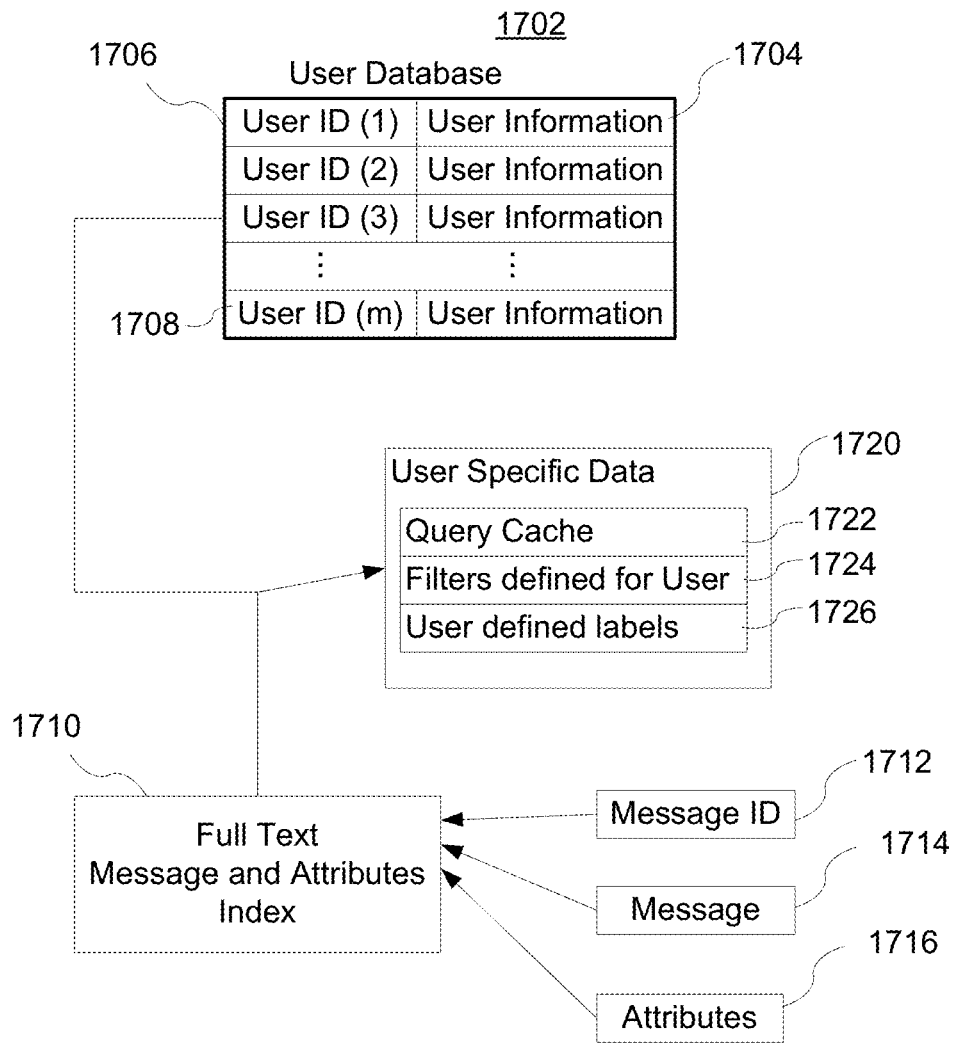
FIG. 17 depicts a user database and an index for a particular user.
Figure 18:
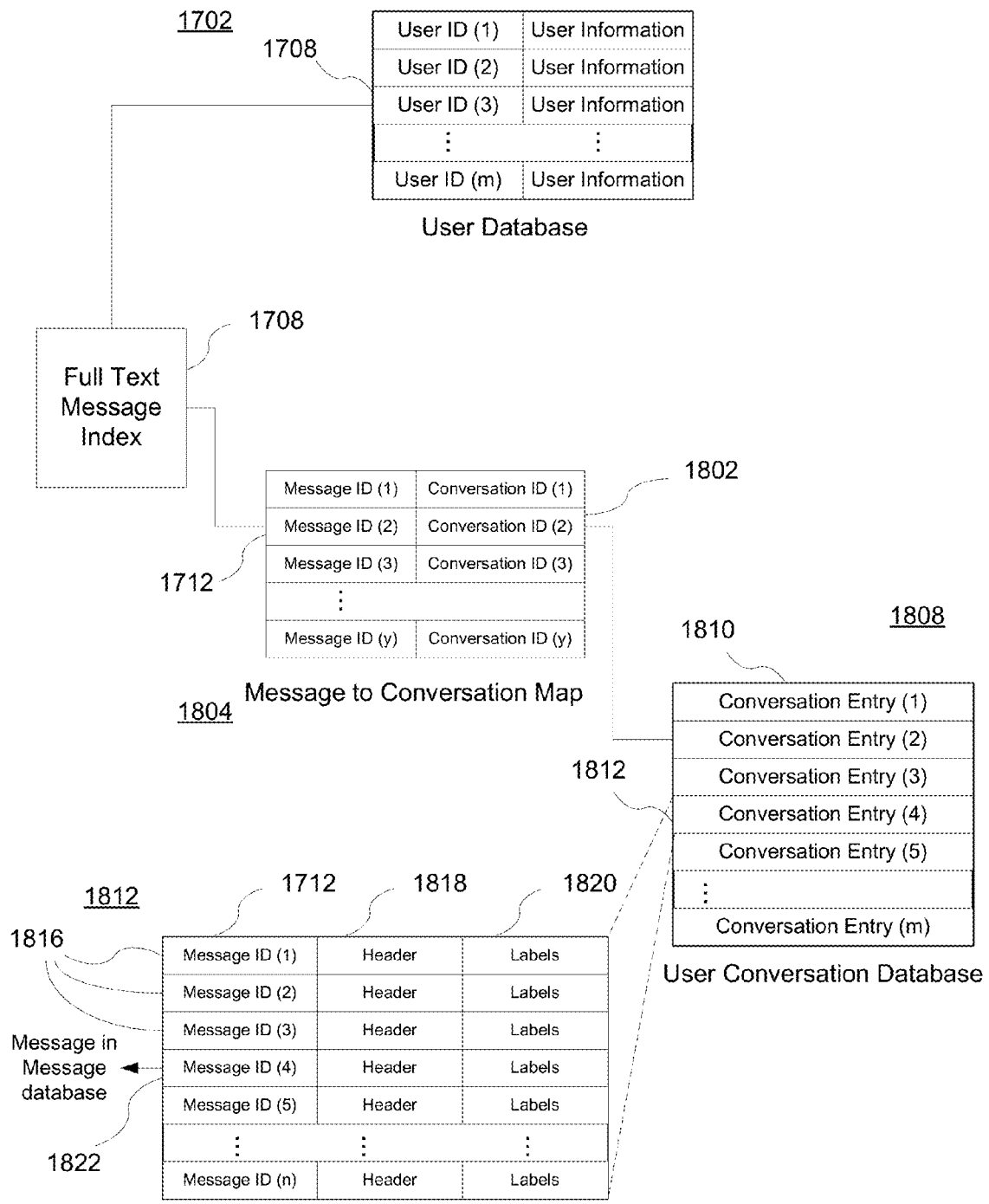
FIG. 18 depicts a set of data structures used for identifying the conversation corresponding to a received message and for determining attributes to be associated with the received message.

FIG. 17 illustrates a user database and message index according to an embodiment of the invention. A User Database 1702 may store information about users. The information stored may include User Information 1704. User Information 1704 might contain various types of user information relating to user preferences, security information, or any other information that might be used by the various embodiments of the invention. The User Database might include user identification information used to identify the users such as User ID (1) (1706) to User ID (m) (1708) where m might represent the number of users of the system. A particular User ID (m) (1708) might be a unique identifier for each user such as a n-bit binary number. Other type of user identification might also be used.

In some embodiments, the User ID of a user is used to identify a set of data structures 1720 for storing information about the filters, queries and labels associated with a user's mail account. In some embodiments, these data structures include a query cache 1722 for storing information representing the last few queries submitted by the user; a set of filter data structures 1724 for storing user-defined filters, if any; and a labels data structure 1726 for storing information representing user-defined labels. The recent queries represented by information stored in the query cache 1722 may be presented to the user, for example in group box 348 (FIG. 3B), to enable the user to easily re-submit these queries to the conversation management system. The user-defined filters are used by the conversation management system during the processing of each new message as it is being added to the user's mail account. The stored information concerning user-defined labels may be presented to the user, for example in a group box 347 (FIG. 3B), to enable the user to easily request a list of conversations bearing a user-selected label.

The User ID of a user may be used to identify a Full Text and Attributes Index 1710 corresponding to the user. A Full Text and Attributes Index 1710 might be associated with a particular user such that a different user cannot search the index for the messages associated with the particular user. The Full Text and Attributes Index 1710 stores information about messages in the user's mail account such that a query applied against the Full Text and Attributes Index 1710 returns a list of matching messages (if any). The list might be returned as a list of message identifiers.

The information included in the Full Text and Attributes Index 1710 for a particular message may include the message's Message ID 1712, the content 1714 of the message 1714, and information about the attributes 1716 of the message. The Message ID 1712 is a unique identifier for the message (i.e., unique with respect to all other messages stored for the same user). The Message ID 1712 may be a n-bit number that is used to reference a particular message stored in the Message Database 1702. In one embodiment, the Message ID 1712 may be a 64-bit number. The Message ID 1712 might be composed of timestamp information and information relating to the content of the message to which the Message ID 1712 refers. The timestamp information might be a Y-bit (e.g., 32-bit or 48-bit) timestamp provided by the system indicating when a message is received by, for example, the SMTP Gateway 1018. The information relating to the content of the message might be 64-Y bit hash of the message contents.

The contents of a message are placed into the index as fully indexed and searchable terms. When the index 1710 is searched for a term or combination of terms, the index returns a list of messages (e.g., message IDs) of messages that match the term or combination of terms. Certain predefined conditions may dictate a return of less than all of the matching messages.

In one embodiment the entries for the search terms in the Full Text and Attributes Index 1710 are be ordered in accordance with the timestamp information included in the Message ID 1712 of each indexed message, such that the most recent messages matching the search terms are preferentially returned. For instance, the list of Message IDs of messages corresponding to each term in the index 1710 may be ordered such that Message IDs having the most recent timestamps are listed earlier in the list than Message IDs having older timestamps. In other embodiments, date/time information associated with each message indicates the date and/or time of receipt of each message, but the date/time information is not embedded in the Message IDs. In such embodiments, the entries in the index 1710 are nevertheless arranged so that the Message IDs of messages having the most recent date/time values are listed earlier in the list than Message IDs having older date/time values.

Any attributes 1716 associated with a message are also indexed (i.e., included in the index 1710). Attributes 1716 are added to the Full Text and Attributes Index 1710 such that a query on a particular attribute returns those messages matching that particular attribute. When a label or attribute is added to or removed from a conversation, the index 1710 is updated accordingly. The index includes entries or data that map each defined label or attribute to all the messages (or, in other embodiments, conversations) bearing that label or attribute. Thus, when a label is added to a conversation, data is added to the index 1710 to map that label to all the messages in the conversation. When a label is removed from a conversation, the data in the index that maps the label to the messages in the conversation is removed or invalidated. In some embodiments, each label or attribute associated with a conversation is also added to one or more entries in a conversation database 1808 (FIG. 18).

Although the Full Text and Attributes Index 1710 may configured to map query terms to individual Message IDs 1712, other data structures may be provided to map Message IDs into conversations identifiers. Logical diagrams of one such set of data structures are shown in FIG. 18. One of ordinary skill in the art would recognize that a number of different data structures can be used to map search query terms to conversations or conversation identifiers.

As described earlier, User Database 1702 may contain a User ID 1708 that references the Full Text and Attributes Index 1710 associated with a particular user. Referring to FIG. 18, a particular Message ID 1712 may be associated with a particular Conversation ID 1802 in a Message to Conversation Map 1804. Each entry in Message to Conversation Map 1804 associates (i.e., maps) a Message ID 1712 to a Conversation ID 1802. In some embodiments, the Conversation ID 1804 is an n-bit number. This number uniquely identifies the particular conversation to which the message identified by Message ID 1712 belongs. In these embodiments, every conversation in a user's mail account has a distinct Conversation ID.

To identify the other messages associated with a particular conversation, a User Conversation Database 1808 may be used. Such a database might be used, for example, when identifying the remainder of the messages included in a conversation where one or more messages had matched a particular search query. User Conversation Database includes a number of Conversation Entries 1810. Each Conversation Entry 1810 stores a list of the messages (or other data structure representing the messages) associated with the conversation. For example, a Conversation Entry 1812 may include a linked list of message entries 1816, each message entry corresponding to a particular message in the conversation. The linked list might be ordered by, for example, date/time values associated with the messages in the conversation. An exemplary message entry 1816 includes the Message ID 1712, Header 1818, and Labels 1820 of a particular message. The Header 1818 may contain all or a portion of the Header Information 1612 described earlier. The Labels 1820 may contain information identifying certain attributes associated with the message. The Message ID(4) 1712 of a particular entry 1822 may be associated with a particular message in the Message Database 1602. In some embodiments, the message entry 1816 does not include the content of the body of the corresponding message.

In some embodiments, the information in the index 1708 and the information in a Conversation Entry 1812 may be used to assist in associating a new message with a particular conversation, as might be done in stage 1106 of FIG. 11, without accessing the Message database 1602. When messages are identified as possible matches to the newly arrived message (stage 1204 of FIG. 12), the determination of the best matching message, and thus the best matching conversation, could be made using the Headers 1818 of the matching messages. For example, Header 1818 might contain subject information for the message that (in normalized form) can be compared to the normalized subject of the newly arrived message. Other information in the Header 1818 can also be compared with header information of an incoming message being processed. Once a conversation has been identified as a match, attributes identified in the Labels 1820 of the message entries for the identified conversation can be applied to the incoming message (stage 1307 of FIG. 13), without having to retrieve any messages from the message database.

A Conversation entry 1812 can be updated when a message is deleted form a conversation, without affecting the other messages in a conversation. In such a case, the message entry 1816 (in Conversation entry 1812) corresponding to the message to be deleted is deleted from the linked list of message entries. Thus, the message will no longer be associated with that conversation. In some embodiments, Message to Conversation Map 1804 is also be modified to account for the deletion.

As described earlier, in some instances it may be desirable to mark a message for deletion, but not remove it from the conversation using, for example, a particular attribute. When the conditions are such that the message may now be removed from the conversation, it may be done as described above. Conditions which may allow for the removal of the message from Message to Conversation Map 1802 and Conversation entry 1812 might include the passing of a certain amount of time since the message was marked for deletion, an action by the user, or other triggering events.

Conversations may also be marked for deletion, but not yet removed from the user's mail account. When a conversation is to be permanently removed from the user's mail account, then the Message to Conversation Map 1802 entry for the conversation may be removed. In addition, the corresponding Conversation entry 1812 may be removed from the Conversation Database 1808, and furthermore the index entries for the messages in the conversation may be removed from the index 1708.

Figure 19:
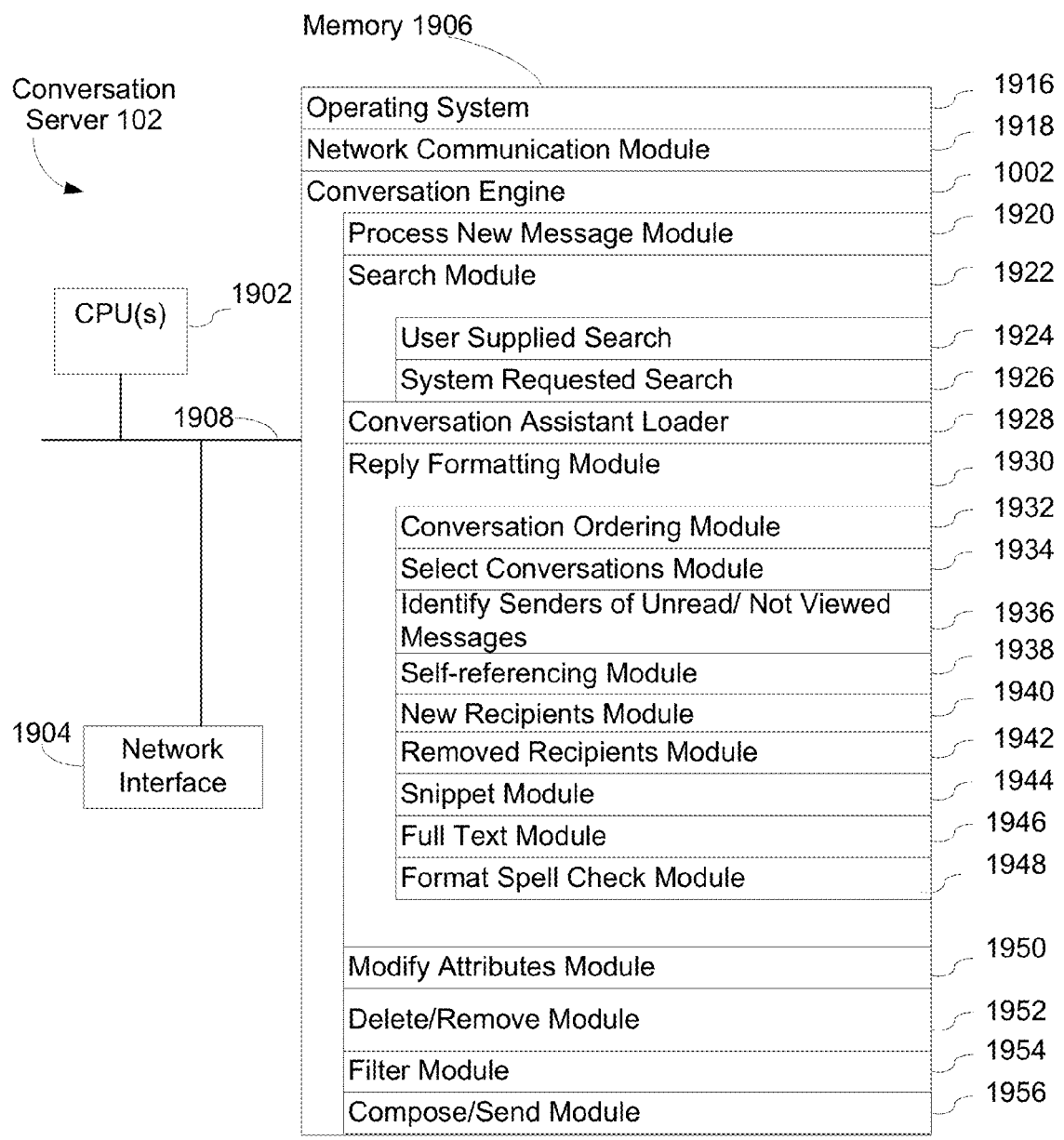
FIG. 19 depicts an embodiment of a conversation server.

Referring to FIG. 19, an embodiment of a Conversation Server 102 that implements the methods described above includes one or more processing units (CPU's) 1902, one or more network or other communications interfaces 1904, memory 1906, and one or more communication buses 1908 for interconnecting these components. The Conversation Server 102 may optionally include a user interface comprising a display device and a keyboard. Memory 1906, or a portion thereof, comprises a computer readable storage medium and may include high speed random access memory and may also include non-volatile memory, such as one or more magnetic or optical storage disks. Memory 1906 may include mass storage that is remotely located from CPU's 1902. The Memory 1906 may store:

an Operating System 1916 that includes procedures for handling various basic system services and for performing hardware dependent tasks;

a Network Communication Module (or instructions) 1918 that is used for connecting the Conversation Server 102 to other computers via the one or more communications Network Interfaces 1904 (wired or wireless), such as the Internet, other wide area networks, local area networks, metropolitan area networks, and so on; and a Conversation Engine 1002 module for responding to requests from, and providing responses to, the Conversation Assistant 110 as described earlier, and may include:

a Process New Message Module 1920 for processing new messages as described earlier;

a Search Module 1922 for searching a user's messages as described earlier, the Search Module 1922 including a module for processing search requests from inputs supplied by the user 1922 and a module for processing system generated searches 1926 initiated by the Conversation Assistant 110;

a Conversation Assistant Loader 1928 for providing to the Conversation Assistant 110 information that allows the Conversation Assistant to process information supplied to it from the Conversation Server 102. In some embodiments, when a client computer is first connected to the Conversation Server 102 for processing email messages, the Conversation Assistant Loader 1928 is invoked to load the Conversation Assistant 110 to the client computer. In some embodiments, the Conversation Assistant Loader 1928 loads the Conversation Assistant 110 onto the client computer each time that an email session is initiated, while in other embodiments the Conversation Assistant 110 is retained by the client computer from one email session to another;

a Reply Formatting Module 1930 for providing formatting information to be supplied to the Conversation Assistant 110 as described earlier, including a Conversation Ordering Module 1932 for ordering conversations according to predefined criteria as described earlier, a Select Conversations Module 1034 for selecting a predetermined number of conversations to be returned to the Conversation Assistant 110 from the total number which could be returned, an Identify Sender of Unread/Not Viewed Messages 1936 for identifying messages marked as "Unread" (i.e., messages not viewed or marked as read) messages as described earlier, a Self-referencing Module 1938 for providing information about replacing the user's identification with a self-referencing information as described earlier, a New Recipients Module 1940 for identifying and providing information about newly added recipients to a conversation as described earlier, a Removed Recipients Module 1942 for identifying and providing information about recipients who are no longer part of the conversation as described earlier, a Snippet Module 1944 for obtaining and providing information about certain text of a matching message as described earlier, a Full Text Module 1946 for retrieving the full text of a message for transmission to the Conversation Assistant 110 as described earlier; and a Format Spell Check Module 1948 for formatting information returned from the Spell Checker 1014;

a Modify Attributes Module 1950 for modifying the attributes of conversations and messages as described earlier;

a Delete/Remove Module 1952 for marking message or conversation for deletion and subsequently removing them as described earlier;

Filter Module 1954 for creating, monitoring, and carrying out filters as described earlier; and a Compose/Send Module 1956 for allowing the user to compose a message and provide the resulting message to the SMTP Gateway 1016.

It should be appreciated that various features described above, such as an exemplary embodiment of a spell check processing and display method, are not limited to electronic messaging or email. For example, the spell checking method or user interface described above may be applied to and implemented in conjunction with various types of documents (e.g., word processing documents) in other embodiments.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A server system, for searching conversations, comprising:
one or more processors; and
memory storing one or more programs to be executed by the one or more processors; the one or more programs comprising instructions for:
receiving a search query from a client; and
responsive to the search query:
identifying a plurality of conversations relevant to the search query, the plurality of conversations including at least two conversations each having two or more messages sharing a common set of characteristics that meets predefined criteria and a respective conversation identifier; and
returning to the client for display, as a search result to the search query,
(i) a list of the identified conversations, each conversation in the list being represented as a single item, at least one conversation in the list of identified conversations comprising two or more electronic messages; and
(ii) a representation of a count of electronic messages included in the at least one conversation.

2. The server system of claim 1, wherein the instructions for identifying the plurality of conversations include instructions for identifying a first message relevant to the search query.

3. The server system of claim 1, wherein the instructions for returning the list of the identified conversations include instructions for formatting for presentation each conversation in the list in a single line.

4. The server system of claim 1, wherein the single item representing a respective conversation includes a list of sender identifiers corresponding to senders who have sent messages in the respective conversation.

5. The server system of claim 4, wherein the list of sender identifiers is ordered according to their respective message arrival time.

6. The server system of claim 4, wherein, at least one sender identifier in the list of sender identifiers is represented by an icon or unique character string distinct from corresponding names of the senders.

7. The server system of claim 1, wherein the predefined criteria include a subject of the two or more messages and information other than the subject, an in-reply-to field, a references field and a message identifier field of the two or more messages.

8. A server system, for searching messages, comprising:
one or more processors; and
memory storing one or more programs to be executed by the one or more processors; the one or more programs comprising instructions for:
searching a message repository to identify two or more messages relevant to a search query, wherein each identified message is associated with a respective conversation of a plurality of conversations, each conversation having a respective conversation identifier, wherein at least one respective conversation of the plurality of conversations comprises two or more messages sharing a common set of characteristics that meets predefined criteria; and
responsive to the search query:
identifying the respective conversation identifiers of the conversations associated with the identified messages;
creating a list of two or more conversations, each of the conversations in the list corresponding to a respective conversation identifier; and
producing, for display at a client, as a search result:
(i) at least a portion of the list of two or more conversations, each conversation in the list being represented as a single item in the list of conversations, at least one conversation of the conversations in the list comprising two or more electronic messages from distinct senders; and
(ii) a representation of a count of electronic messages included in the at least one conversation.

9. The server system of claim 8, wherein the list of two or more conversations is formatted for display in a single line.

10. The server system of claim 8, wherein the single item representing a respective conversation includes a list of sender identifiers corresponding to senders who have sent messages in the conversation.

11. The server system of claim 10, wherein, at least one sender identifier in the list of sender identifiers is represented by an icon or unique character string distinct from corresponding names of the senders.

12. The server system of claim 8, wherein the predefined criteria include a subject of the two or more messages and information other than the subject, an in-reply-to field, a references field, and a message identifier field of the two or more messages.

13. A server system, for searching messages, comprising:
one or more processors; and
memory storing one or more programs to be executed by the one or more processors; the one or more programs comprising instructions for:
receiving a search query from a client; and
responsive to the search query:
identifying a plurality of conversations relevant to the search query, the plurality of conversations including at least two conversations each having two or more messages sharing a common set of characteristics that meets predefined criteria and a same conversation identifier; and
returning to the client for display, as a search result to the search query,
(i) a list of the identified conversations, each conversation in the list being represented as a single item in the list of conversations, at least one conversation in the list of identified conversations comprising two or more electronic messages; and
(ii) a representation of a count of electronic messages included in the at least one conversation.

14. The server system of claim 13, wherein identifying the the plurality of conversations includes identifying a first message relevant to the search query.

15. The server system of claim 13, wherein each conversation in the list of identified conversations is formatted for presentation in a single line.

16. The server system of claim 13, wherein the single item representing a respective conversation in the list of identified conversations includes a list of sender identifiers corresponding to senders who have sent messages in the conversation.

17. The server system of claim 16, wherein the list of sender identifiers is ordered according to their respective message arrival time.

18. The server system of claim 16, wherein, at least one sender identifier is represented by an icon or unique character string distinct from names of the senders.

19. The server system of claim 13, wherein the predefined criteria include a subject of the two or more messages and information other than the subject, an in-reply-to field, a references field, and a message identifier field of the two or more messages.

* * * * *